United States Patent
Ko et al.

(10) Patent No.: US 11,889,477 B2
(45) Date of Patent: Jan. 30, 2024

(54) METHOD AND DEVICE FOR SELECTING CANDIDATE RESOURCE DURING SL DRX OPERATION IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/168,091

(22) Filed: Feb. 13, 2023

(65) Prior Publication Data

US 2023/0199724 A1   Jun. 22, 2023

Related U.S. Application Data

(63) Continuation of application No. PCT/KR2022/003373, filed on Mar. 10, 2022.

(30) Foreign Application Priority Data

Mar. 9, 2021   (KR) .................. 10-2021-0030543

(51) Int. Cl.
- *H04W 72/02*   (2009.01)
- *H04W 76/28*   (2018.01)
- *H04W 72/25*   (2023.01)
- *H04W 72/0446*   (2023.01)

(52) U.S. Cl.
CPC ....... *H04W 72/02* (2013.01); *H04W 72/0446* (2013.01); *H04W 72/25* (2023.01); *H04W 76/28* (2018.02)

(58) Field of Classification Search
CPC ............. H04W 72/02; H04W 72/25; H04W 72/0446; H04W 76/28
See application file for complete search history.

(56) References Cited

U.S. PATENT DOCUMENTS

2020/0029245 A1   1/2020   Khoryaev et al.

FOREIGN PATENT DOCUMENTS

| WO | WO-2022086182 A1 * | 4/2022 |
| WO | WO-2023090938 A1 * | 5/2023 |

OTHER PUBLICATIONS

LG Electronics, R1-2103378, 'Discussion on resource allocation for power saving', 3GPP TSG RAN WG1 Meeting #104bis-e, Apr. 12-Apr. 20, 2021, pp. 1-21. (Year: 2021).*
PCT International Application No. PCT/KR2022/003373, International Search Report dated Jun. 9, 2022, 4 pages.

(Continued)

*Primary Examiner* — Melvin C Marcelo
(74) *Attorney, Agent, or Firm* — LEE, HONG, DEGERMAN, KANG & WAIMEY

(57) ABSTRACT

An operating method of a first device (100) in a wireless communication system is presented. The method may comprise the steps of: selecting X number of candidate resources on the basis of sensing within a selection window, the X number of candidate resources being included in the active time of an SL DRX configuration related to a second device (200); and selecting a transmission resource for the transmission of a MAC PDU on the basis of the X number of candidate resources.

15 Claims, 23 Drawing Sheets

(56) References Cited

OTHER PUBLICATIONS

LG Electronics, "Discussion on resource allocation for power saving," R1-2100517, 3GPP TSG RAN WG1 Meeting #104-e, e-Meeting, Feb. 2021, 22 pages.
Samsung, "On resource allocation for power saving," R1-2101231, 3GPP TSG RAN WG1 Meeting #104-e, e-Meeting, Feb. 2021, 9 pages.
Moderator (OPPO), "FL summary for AI 8.11.1.1—resource allocation for power saving," R1-2101412, 3GPP TSG RAN WG1 #104-e, e-Meeting, Feb. 2021, 93 pages.
OPPO, "Power saving mechanisms in NR sidelink," R1-2100141, 3GPP TSG RAN WG1 #104-e, e-Meeting, Feb. 2021, 14 pages.

* cited by examiner

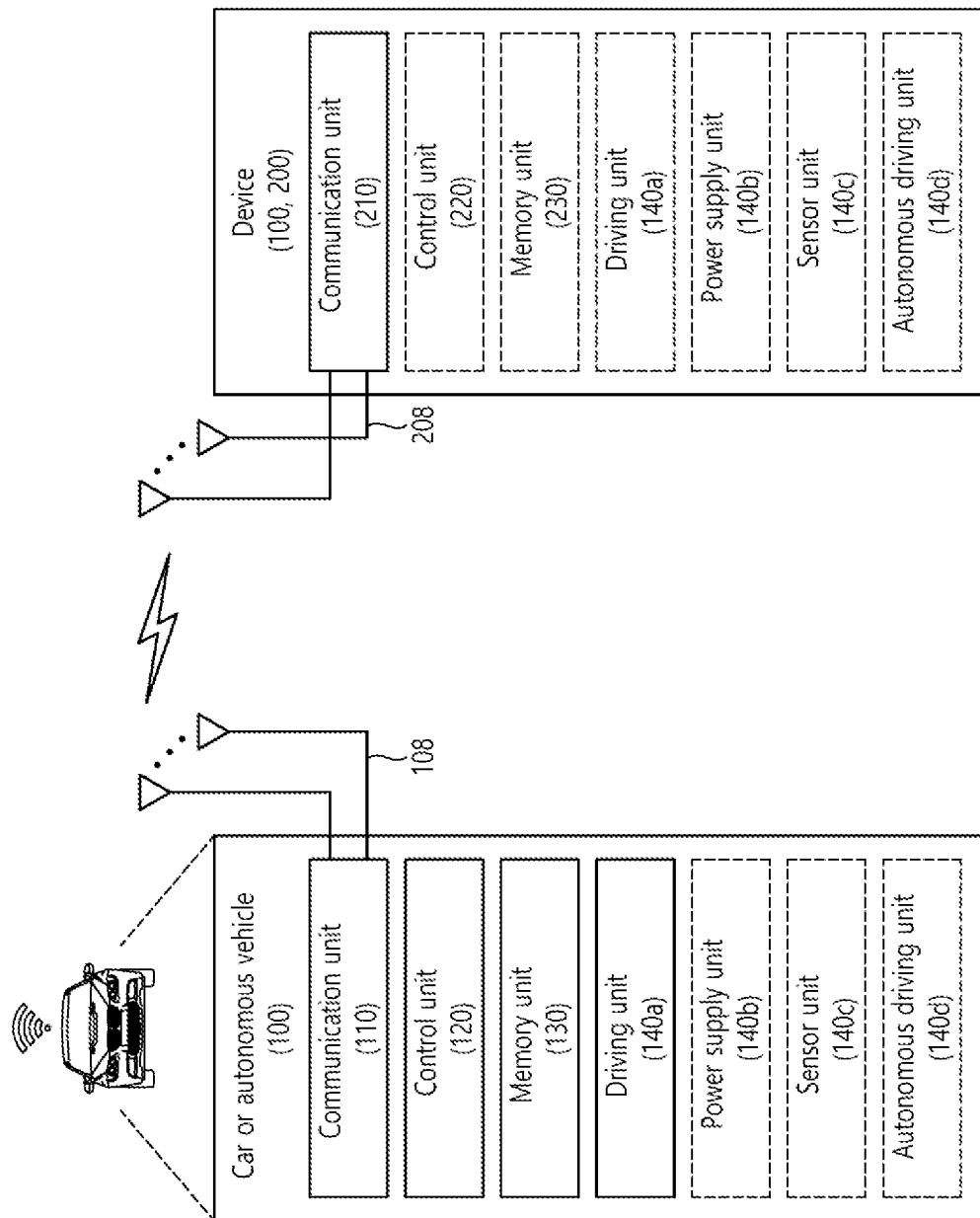

METHOD AND DEVICE FOR SELECTING CANDIDATE RESOURCE DURING SL DRX OPERATION IN NR V2X

CROSS-REFERENCE TO RELATED APPLICATIONS

This application is a continuation of International Application No. PCT/KR2022/003373, filed on Mar. 10, 2022, which claims the benefit of earlier filing date and right of priority to Korean Application No. 10-2021-0030543, filed on Mar. 9, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the disclosure, a method for performing, by a first device, wireless communication may be proposed. For example, the method may comprise: determining a selection window; selecting X candidate resources based on sensing within the selection window, wherein the X candidate resources are included within an active time of a sidelink (SL) discontinuous reception (DRX) configuration related to a second device; selecting a transmission resource for a transmission of a medium access control (MAC) protocol data unit (PDU) based on the X candidate resources; transmitting, to the second device, sidelink control information (SCI) for scheduling of a physical sidelink shared channel (PSSCH) through a physical sidelink control channel (PSCCH), based on the transmission resource; and transmitting, to the second device, the MAC PDU through the PSSCH, based on the transmission resource.

According to an embodiment of the disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine a selection window; select X candidate resources based on sensing within the selection window, wherein the X candidate resources may be included within an active time of a sidelink (SL) discontinuous reception (DRX) configuration related to a second device; select a transmission resource for a transmission of a medium access control (MAC) protocol data unit (PDU) based on the X candidate resources; transmit, to the second device, sidelink control information (SCI) for scheduling of a physical sidelink shared channel (PSSCH) through a physical sidelink control channel (PSCCH), based on the transmission resource; and transmit, to the second device, the MAC PDU through the PSSCH, based on the transmission resource.

According to an embodiment of the disclosure, a device adapted to control a first user equipment (UE) may be proposed. For example, the device may comprise: one or more processors; and one or more memories operably connectable to the one or more processors and storing instructions. For example, the one or more processors may execute the instructions to: determine a selection window; select X candidate resources based on sensing within the selection window, wherein the X candidate resources may be included within an active time of a sidelink (SL) discontinuous reception (DRX) configuration related to a second UE; select a transmission resource for a transmission of a medium access control (MAC) protocol data unit (PDU) based on the X candidate resources; transmit, to the second UE, sidelink control information (SCI) for scheduling of a physical sidelink shared channel (PSSCH) through a physical sidelink control channel (PSCCH), based on the transmission resource; and transmit, to the second UE, the MAC PDU through the PSSCH, based on the transmission resource.

According to an embodiment of the disclosure, a non-transitory computer-readable storage medium storing instructions may be proposed. For example, the instructions, when executed, may cause a first device to: determine a selection window; select X candidate resources based on sensing within the selection window, wherein the X candidate resources may be included within an active time of a sidelink (SL) discontinuous reception (DRX) configuration related to a second device; select a transmission resource for a transmission of a medium access control (MAC) protocol data unit (PDU) based on the X candidate resources; transmit, to the second device, sidelink control information (SCI) for scheduling of a physical sidelink shared channel (PSSCH) through a physical sidelink control channel (PSCCH), based on the transmission resource; and transmit, to the second device, the MAC PDU through the PSSCH, based on the transmission resource.

According to an embodiment of the disclosure, a method for performing, by a second device, wireless communication may be proposed. For example, the method may comprise: receiving, from a first device, sidelink control information (SCI) for scheduling of a physical sidelink shared channel (PSSCH) through a physical sidelink control channel (PSCCH), based on a transmission resource; and receiving, from the first device, a medium access control (MAC) protocol data unit (PDU) through the PSSCH, based on the transmission resource, wherein the transmission is selected in Y candidate resources, wherein X candidate resources among the Y candidate resources are included within an active time of a sidelink (SL) discontinuous reception (DRX) configuration related to the second device, and wherein the Y candidate resources are selected based on sensing within a selection window.

According to an embodiment of the disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling of a physical sidelink shared channel (PSSCH) through a physical sidelink control channel (PSCCH), based on a transmission resource; and receive, from the first device, a medium access control (MAC) protocol data unit (PDU) through the PSSCH, based on the transmission resource, wherein the transmission may be selected in Y candidate resources, wherein X candidate resources among the Y candidate resources may be included within an active time of a sidelink (SL) discontinuous reception (DRX) configuration related to the second device, and wherein the Y candidate resources may be selected based on sensing within a selection window.

A UE may efficiently perform sidelink communication.

BRIEF DESCRIPTION OF THE DRAWINGS

FIG. 23 shows a vehicle or an autonomous vehicle, based on an embodiment of the present disclosure.

DETAILED DESCRIPTION

Figure 1:
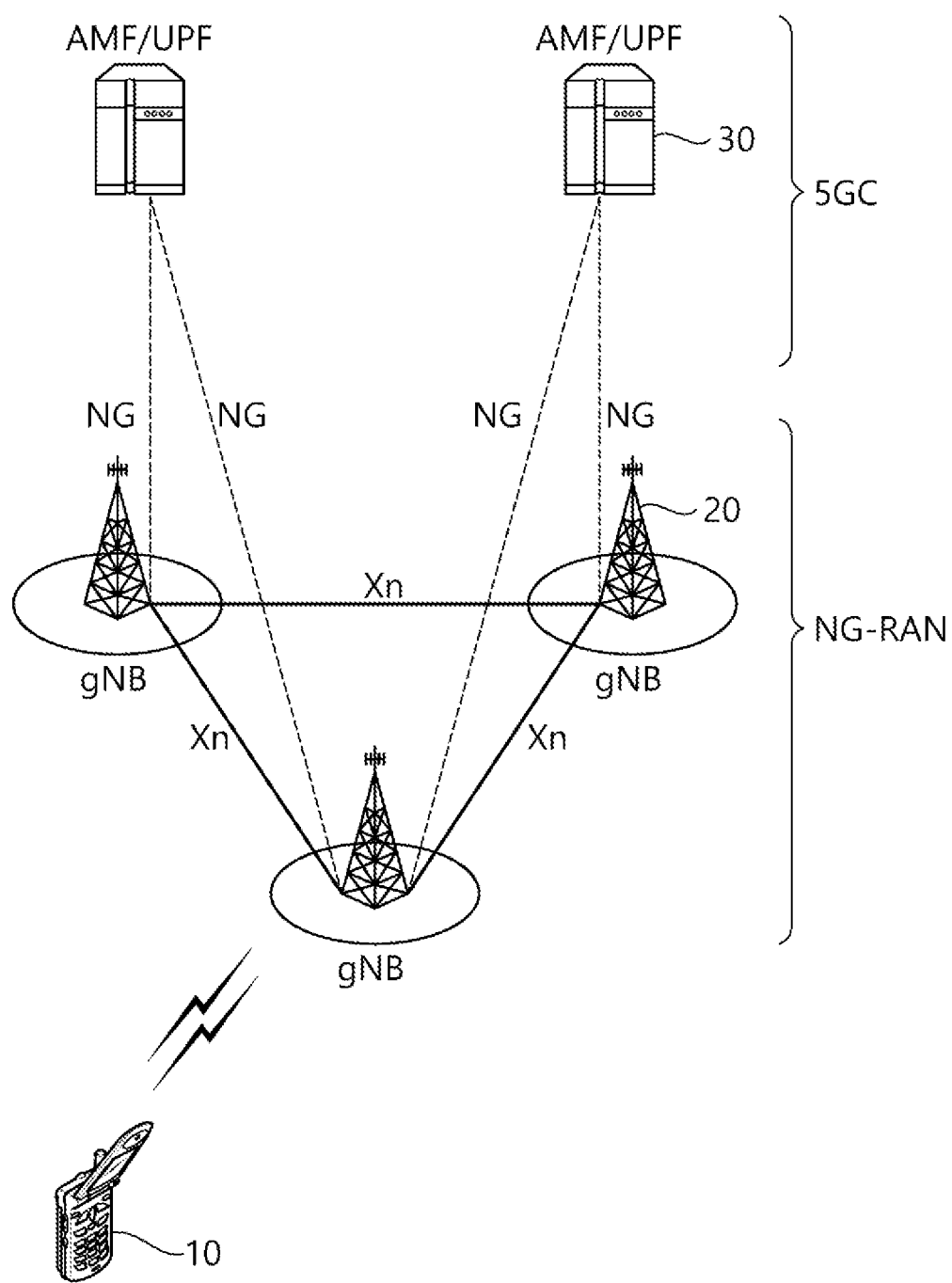
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
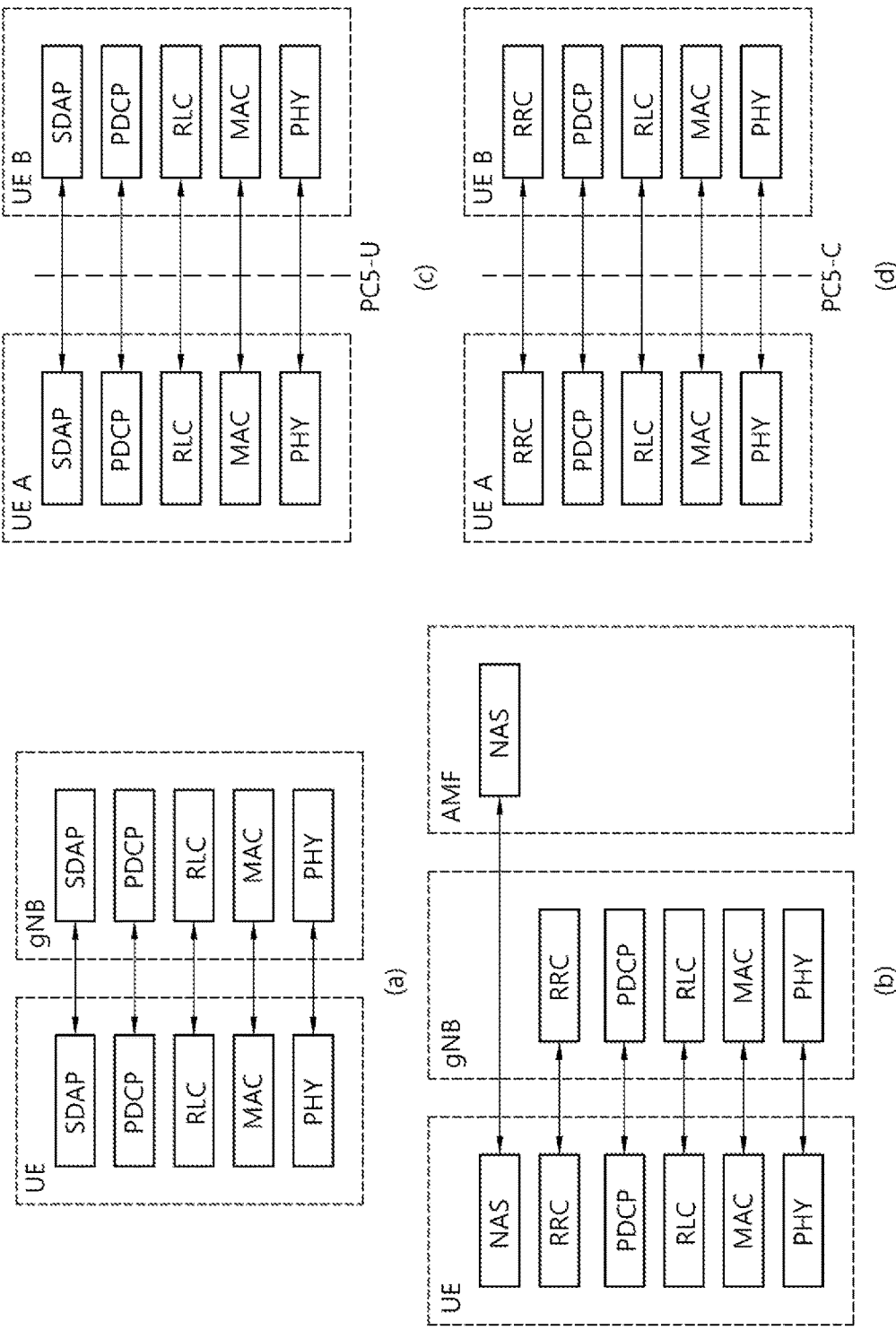
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
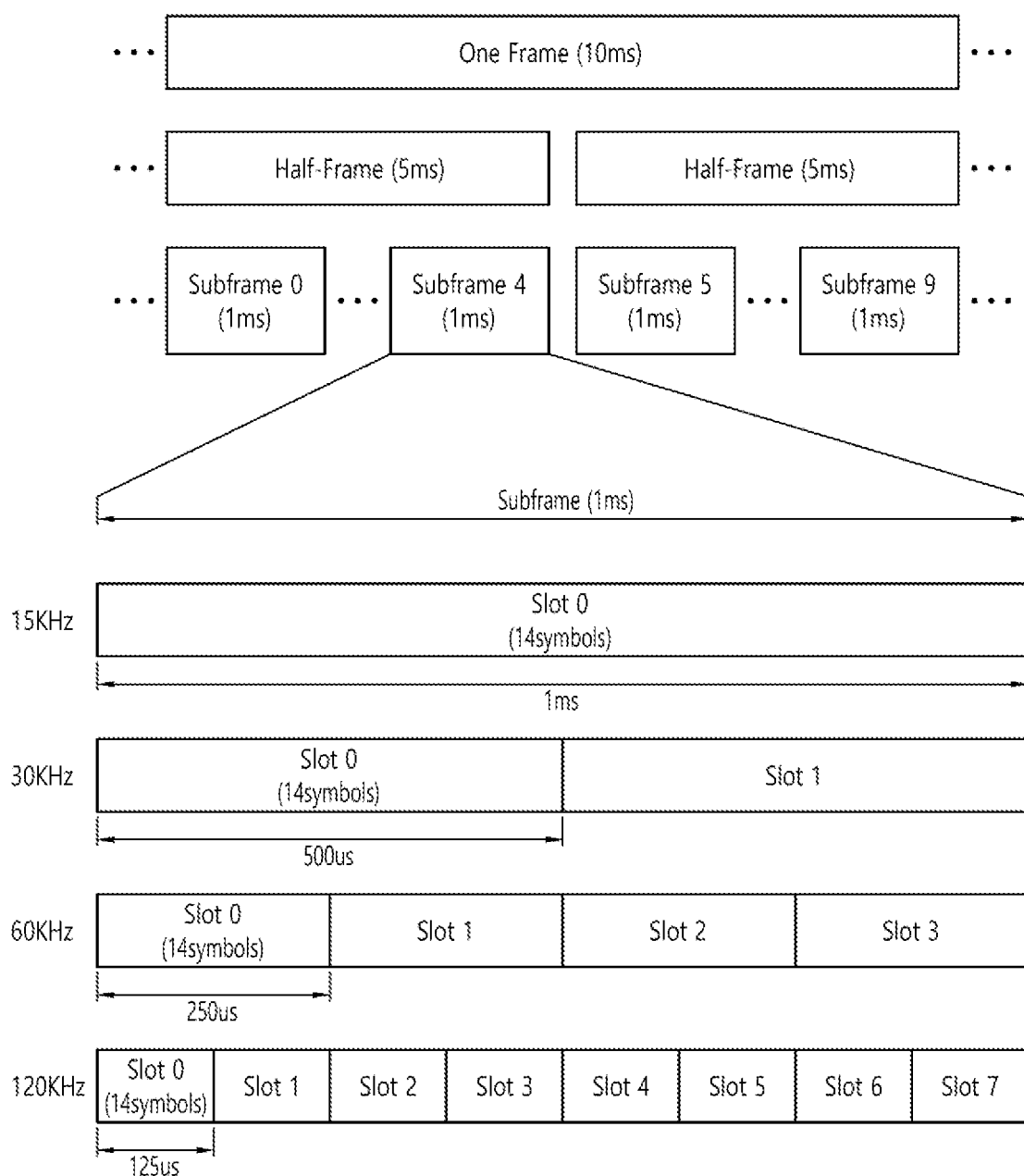
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
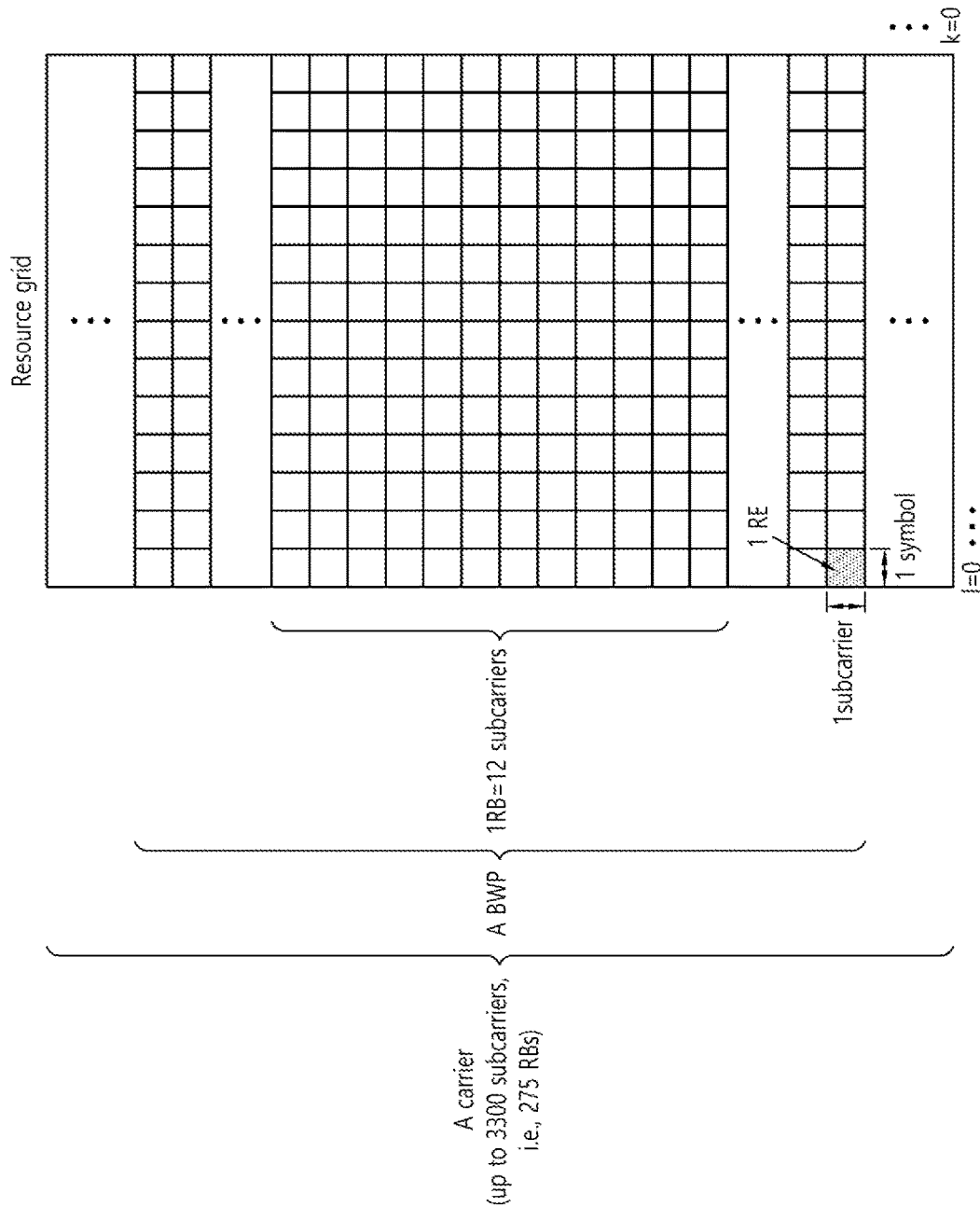
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the ULE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
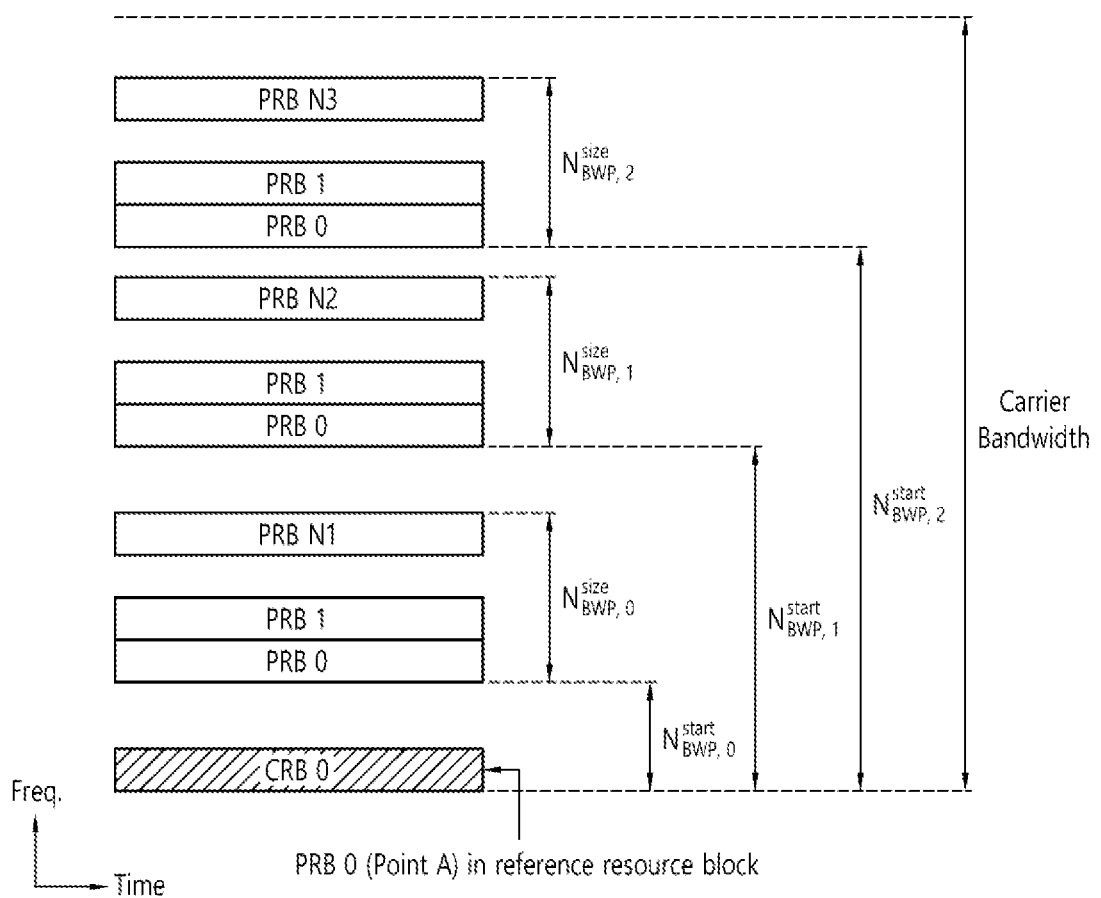
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
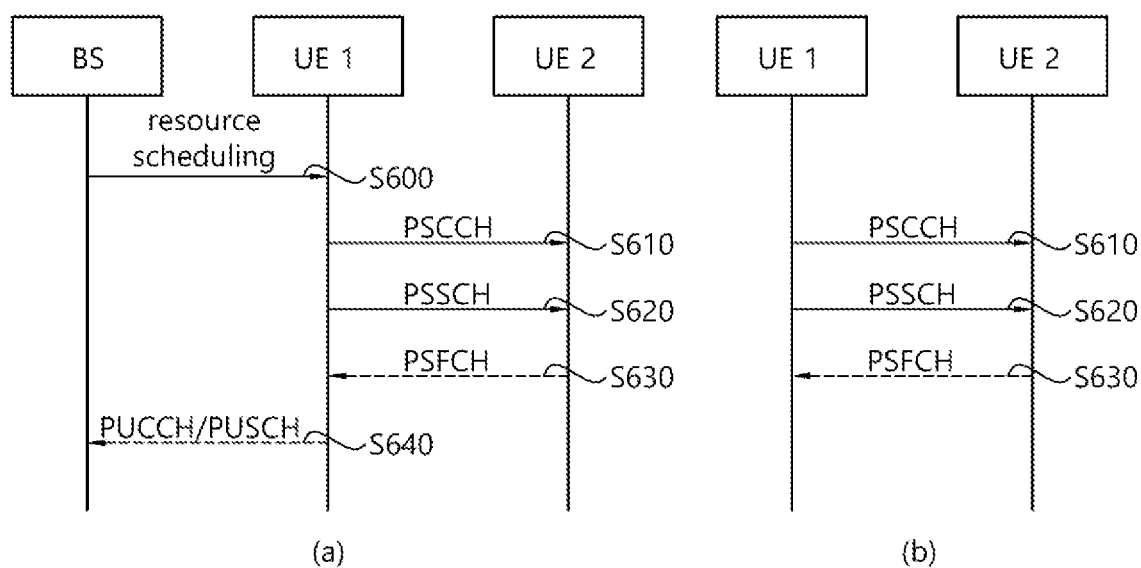
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 Bits

Frequency resource assignment—ceiling ($\log_2 (N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
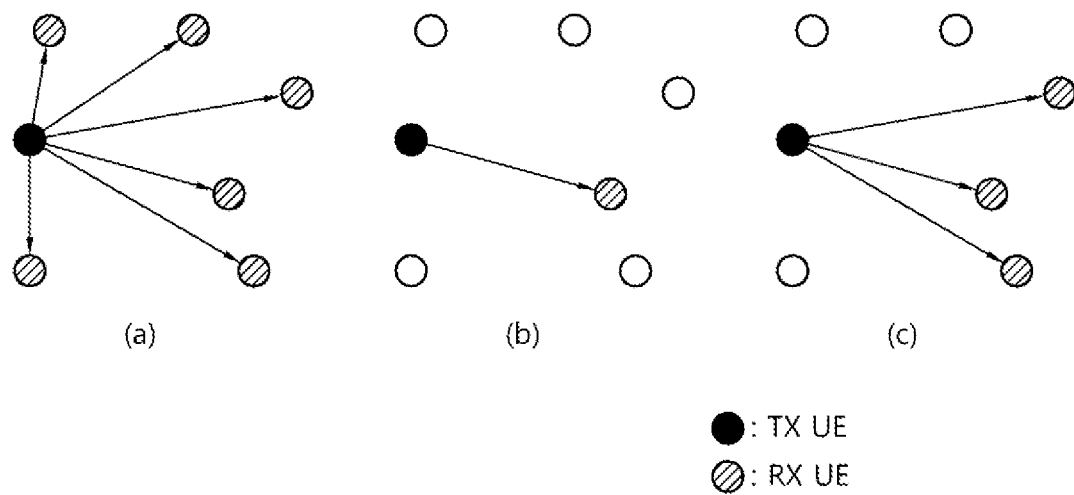
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a UE procedure for determining a subset of resources to be reported to a higher layer in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp\_TX}$, in units of msec.
if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources ($r_0, r_1, r_2, \ldots$) which may be subject to pre-emption.
it is up to UE implementation to determine the subset of resources as requested by higher layers before or after the slot $r_i''-T_3$, where $r_i''$ is the slot with the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots, and where $\mu_{SL}$ is the SCS configuration of the SL BWP.

The following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec.

sl-TxPercentageList: internal parameter X for a given $prio_{TX}$ is defined as sl-TxPercentageList ($prio_{TX}$) converted from percentage to ratio.

sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P_{rsvp\_TX}'$.

Notation:

$(t_0'^{SL}, t_1'^{SL}, t_2'^{SL}, \ldots)$ may denote the set of slots which belongs to the sidelink resource pool.

For example, a UE may select a set of candidate resources (Sa) based on Table 8. For example, when resource (re)selection is triggered, a UE may select a candidate resource set (Sa) based on Table 8. For example, when re-evaluation or pre-emption is triggered, a UE may select a candidate resource set (Sa) based on Table 8.

TABLE 8

The following steps are used:
1) A candidate single-slot resource for transmission $R_{x,y}$ is defined as a set of $L_{subCH}$ contiguous sub-channels with sub-channel $x + j$ in slot $t_y'^{SL}$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where
   selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
   if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).
   The total number of candidate single-slot resources is denoted by $M_{total}$.
2) The sensing window is defined by the range of slots $[n - T_0, n - T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter $Th(p_i, p_j)$ is set to the corresponding value of RSRP threshold indicated by the i-th field in sl-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
   the UE has not monitored slot $t_m'^{SL}$ in Step 2.
   for any periodicity value allowed by the higher layer parameter sl-ResourceReservePeriodList and a hypothetical SCI format 1-A received in slot $t_m'^{SL}$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than $X \cdot M_{total}$, the set $S_A$ is initialized to the set of all the candidate single-slot resources as in step 4.
6) The UE shall exclude any candidate single-slot resource $R_{x,y}$ from the set $S_A$ if it meets all the following conditions:
   a) the UE receives an SCI format 1-A in slot $t_m'^{SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];
   b) the RSRP measurement performed, according to clause 8.4.2.1 for the received SCI format 1-A, is higher than $Th(prio_{RX}, prio_{TX})$;
   c) the SCI format received in slot $t_m'^{SL}$ or the same SCI format which, if and only if the 'Resource reservation period' field is present in the received SCI format 1-A, is assumed to be received in slot(s) $t_{m+q \times P_{rsvp\_RX}'}^{SL}$ determines according to clause 8.1.5 the set of resource blocks and slots which overlaps with $R_{x,y+j \times P_{rsvp\_TX}'}$ for $q = 1, 2, \ldots, Q$ and $j = 0, 1, \ldots, C_{resel} - 1$. Here, $P_{rsvp\_RX}'$ is $P_{rsvp\_RX}$ converted to units of logical slots according to clause 8.1.7, $Q = \left\lceil \dfrac{T_{scal}}{P_{rsvp\_RX}'} \right\rceil$ TABLE 8-continued if $P_{rsvp\_RX} < T_{scal}$ and $n' - m \leq P'_{rsvp\_RX}$, where $t'^{SL}_n = n$ if slot n belongs to the set $(t'^{SL}_0, t'^{SL}_1, \ldots, t'^{SL}_{T_{max}-1})$, otherwise slot $t'^{SL}_n$ is the first slot after slot n belonging to the set $(t'^{SL}_0, t'^{SL}_1, \ldots, t'^{SL}_{T_{max}-1})$; otherwise Q = 1. $T_{scal}$ is set to selection window size $T_2$ converted to units of msec.
7) If the number of candidate single-slot resources remaining in the set $S_A$ is smaller than $X \cdot M_{total}$, then Th($p_i$, $p_j$) is increased by 3 dB for each priority value Th($p_i$, $p_j$) and the procedure continues with step 4.
The UE shall report set $S_A$ to higher layers.
If a resource $r_i$ from the set ($r_0, r_1, r_2, \ldots$) is not a member of $S_A$, then the UE shall report re-evaluation of the resource $r_i$ to higher layers.
If a resource $r'_i$ from the set ($r'_0, r'_1, r'_2, \ldots$) meets the conditions below then the UE shall report pre-emption of the resource $r'_i$ to higher layers.
    $r'_i$ is not a member of $S_A$, and
    $r'_i$ meets the conditions for exclusion in step 6, with Th($prio_{RX}$, $prio_{TX}$) set to the final threshold after executing steps 1)-7), i.e. including all necessary increments for reaching $X \cdot M_{total}$, and
    the associated priority $prio_{RX}$, satisfies one of the following conditions:
        sl-PreemptionEnable is provided and is equal to 'enabled' and $prio_{TX} > prio_{RX}$
        sl-PreemptionEnable is provided and is not equal to 'enabled', and $prio_{RX} <$ $prio_{pre}$ and $prio_{TX} > prio_{RX}$ Meanwhile, partial sensing may be supported for power saving of the UE. For example, in LTE SL or LTE V2X, the UE may perform partial sensing based on Tables 9 and 10.

TABLE 10

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers.
In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers. $C_{resel}$ is determined by $C_{resel} = 10 *$ SL_RESOURCE_RESELECTION_COUNTER, where SL_RESOURCE_RESELECTION_COUNTER is provided by higher layers.
. . .
If partial sensing is configured by higher layers then the following steps are used:
  1) A candidate single-subframe resource for PSSCH transmission $R_{x,y}$ is defined as a set of $L_{subCH}$ contiguous sub-channels with sub-channel $x + j$ in subframe $t^{SL}_y$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.
  2) If a subframe $t^{SL}_y$ is included in the set of subframes in Step 1, the UE shall monitor any subframe $t^{SL}_{y-k \times P_{step}}$ if k-th bit of the high layer parameter gapCandidateSensing is set to 1. The UE shall perform the behaviour in the following steps based on PSCCH decoded and S-RSSI measured in these subframes.
  3) The parameter $Th_{a,b}$ is set to the value indicated by the i-th SL-ThresPSSCH-RSRP field in SL-ThresPSSCH-RSRP-List where $i = (a - 1) * 8 + b$.
  4) The set $S_A$ is initialized to the union of all the candidate single-subframe resources. The set $S_B$ is initialized to an empty set.
  5) The UE shall exclude any candidate single-subframe resource $R_{x,y}$ from the set $S_A$ if it meets all the following conditions:
    the UE receives an SCI format 1 in subframe $t^{SL}_m$, and "Resource reservation" field and "Priority" field in the received SCI format 1 indicate the values $P_{rsvp\_RX}$ and $prio_{RX}$, respectively.
    PSSCH-RSRP measurement according to the received SCI format 1 is higher than $Th_{prio_{TX}, prio_{RX}}$.
    the SCI format received in subframe $t^{SL}_m$ or the same SCI format 1 which is assumed to be received in subframe(s) $t^{SL}_{m+q \times P_{step} \times P_{rsvp\_RX}}$ determines according to 14.1.1.4C the set of resource blocks and subframes which overlaps with $R_{x,y+j \times P_{rsvp\_TX}}$ for $q = 1, 2, \ldots, Q$ and $j = 0, 1, C_{resel} - 1$.

Here, $Q = \dfrac{1}{P_{rsvp\_RX}}$ if

TABLE 10-continued $P_{rsvp\_RX} < 1$ and $y' - m \le P_{step} \times P_{rsvp\_RX} + P_{step}$, where $t_{y'}^{SL}$ is the last subframe of the Y subframes, and Q = 1 otherwise.
6) If the number of candidate single-subframe resources remaining in the set $S_A$ is smaller than $0.2 \cdot M_{total}$, then Step 4 is repeated with $Th_{a,b}$ increased by 3 dB.

TABLE 11

7) For a candidate single-subframe resource $R_{x,y}$ remaining in the set $s_A$, the metric $E_{x,y}$ is defined as the linear average of S-RSSI measured in sub-channels $x + k$ for $k = 0, \ldots, L_{subCH} - 1$ in the monitored subframes in Step 2 that can be expressed by $t_{y-P_{step} \ast j}^{SL}$ for a non-negative integer j.
8) The UE moves the candidate single-subframe resource $R_{x,y}$ with the smallest metric $E_{x,y}$ from the set $s_A$ to $s_B$. This step is repeated until the number of candidate single-subframe resources in the set $s_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $s_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.

The UE shall report set $s_B$ to higher layers.

If transmission based on random selection is configured by upper layers and when the UE is configured by upper layers to transmit using resource pools on multiple carriers, the following steps are used:
1) A candidate single-subframe resource for PSSCH transmission $R_{x,y}$ is defined as a set of $L_{subCH}$ contiguous sub-channels with sub-channel $x + j$ in subframe $t_y^{SL}$ where $j = 0, \ldots, L_{subCH} - 1$. The UE shall assume that any set of $L_{subCH}$ contiguous sub-channels included in the corresponding PSSCH resource pool within the time interval $[n + T_1, n + T_2]$ corresponds to one candidate single-subframe resource, where selections of $T_1$ and $T_2$ are up to UE implementations under $T_1 \le 4$ and $T_{2\ min}(prio_{TX}) \le T_2 \le 100$, if $T_{2\ min}(prio_{TX})$ is provided by higher layers for $prio_{TX}$, otherwise $20 \le T_2 \le 100$. UE selection of $T_2$ shall fulfil the latency requirement. The total number of the candidate single-subframe resources is denoted by $M_{total}$.
2) The set $s_A$ is initialized to the union of all the candidate single-subframe resources. The set $s_B$ is initialized to an empty set.
3) The UE moves the candidate single-subframe resource $R_{x,y}$ from the set $s_A$ to $s_B$.
4) The UE shall exclude a candidate single-subframe resource $R_{x,y}$ from $s_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time].

The UE shall report set $s_B$ to higher layers.

Figure 8:
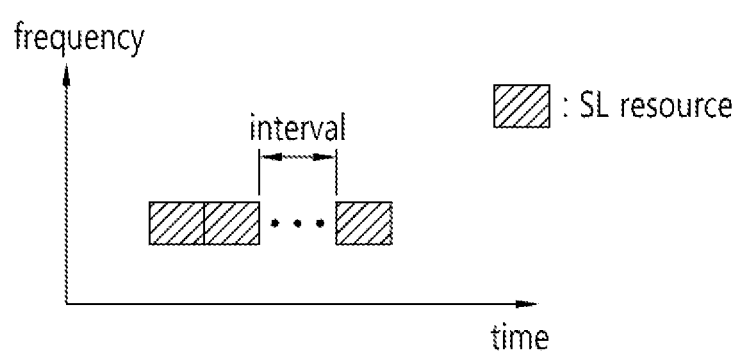
FIG. 8 shows an example of a burst resource according to an embodiment of the present disclosure.

FIG. 8 shows an example of a burst resource according to an embodiment of the present disclosure. The embodiment of FIG. 8 may be combined with various embodiments of the present disclosure.

Referring to FIG. 8, a UE may select/determine a plurality of resources. For example, a UE may select/determine a plurality of resources within a resource pool. For example, the plurality of resources may be continuous resources in the time domain. For example, the plurality of resources may be resources with a time interval (e.g., slot interval) within a threshold value in the time domain.

Figure 9:
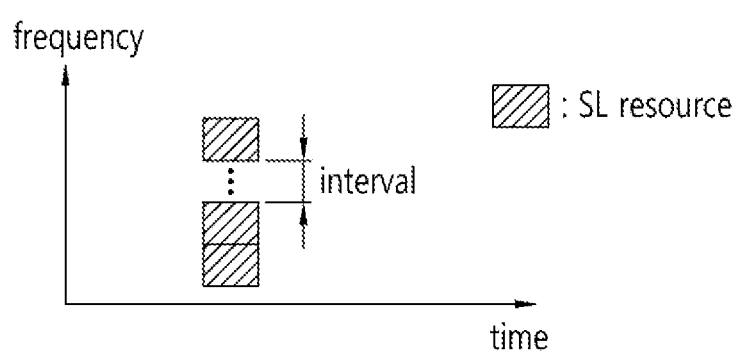
FIG. 9 shows an example of a burst resource according to an embodiment of the present disclosure.

FIG. 9 shows an example of a burst resource according to an embodiment of the present disclosure. The embodiment of FIG. 9 may be combined with various embodiments of the present disclosure.

Referring to FIG. 9, a UE may select/determine a plurality of resources. For example, a UE may select/determine a plurality of resources within a resource pool. For example, the plurality of resources may be continuous resources in the frequency domain. For example, the plurality of resources may be resources with frequency intervals (e.g., RB intervals or subchannel intervals) within a threshold value in the frequency domain.

Meanwhile, SL communication needs to be performed based on aggregated resources (e.g., burst resources) in NR V2X. For example, an aggregated resource be a contiguous set of resources (e.g., a contiguous set of resources in the time domain and/or frequency domain). For example, an aggregated resource may be a set of resources with an interval within a threshold value (e.g., a set of resources spaced apart within a threshold in the time domain and/or frequency domain). Hereinafter, the reason why aggregated resource-based SL communication is required in NR V2X will be described in detail.

For example, unlike LTE V2X, aperiodic transmission is supported in NR V2X. Compared to periodic transmission, aperiodic transmission has a high possibility of transmission failure due to channel congestion or the like within a packet delay budget (PDB) of a packet from the time of packet generation. Accordingly, a UE may perform burst transmission by selecting aggregated resources for aperiodic transmission, thereby maximizing the transmission success probability within the PDB.

For example, unlike LTE V2X, in NR V2X, packets with strict delay requirements need to be transmitted. Table 11 shows the mapping between Standardized PQI and QoS characteristics.

TABLE 11

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 21 | GBR (NOTE 1) | 3 | 20 ms | $10^{-4}$ | N/A | 2000 ms | Platooning between UEs - Higher degree of automation; Platooning between UE and RSU - Higher degree of automation |
| 22 | | 4 | 50 ms | $10^{-2}$ | N/A | 2000 ms | Sensor sharing - higher degree of automation |
| 23 | | 3 | 100 ms | $10^{-4}$ | N/A | 2000 ms | Information sharing for automated driving - between UEs or UE and RSU - higher degree of automation |
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning - information sharing with RSU |
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 90 | Delay Critical GBR (NOTE 1) | 3 | 10 ms | $10^{-4}$ | 2000 bytes | 2000 ms | Cooperative collision avoidance; Sensor sharing - Higher degree of automation; Video sharing - higher degree of automation |
| 91 | | 2 | 3 ms | $10^{-5}$ | 2000 bytes | 2000 ms | Emergency trajectory alignment; Sensor sharing - Higher degree of automation |

(NOTE 1):
GBR and Delay Critical GBR PQIs can only be used for unicast PC5 communications.

Referring to Table 11, the PDB corresponding to PQI 91 is 3 ms. In this case, in the case of 15 kHz, a UE must transmit the corresponding packet within 3 slots. If aggregated resources are not supported, a UE can transmit a packet corresponding to PQI 91 using only one slot, and if the transmission fails, the UE's retransmission opportunity may not be guaranteed. However, if aggregated transmission is supported, a UE can transmit packets corresponding to PQI 91 using 3 consecutive slots, and through this, the transmission success probability can be increased. For convenience of description, the description is based on PQI 91, but the same problem may occur in packets having tight delay requirements, such as PQI 55 and PQI 21.

Meanwhile, aggregated resource selection/reservation may be required to reduce UE power consumption. For example, a UE performing partial sensing or random resource selection (e.g., a power-saving UE) may perform full sensing for a short period of time prior to the selected transmission resource timing (hereinafter referred to as short-term sensing (STS)) in order to avoid resource collision due to aperiodic transmission. For example, since the STS is performed before each selected transmission resource, power consumption of a UE by the STS may increase when the selected resource is temporally distant.

Figure 10:
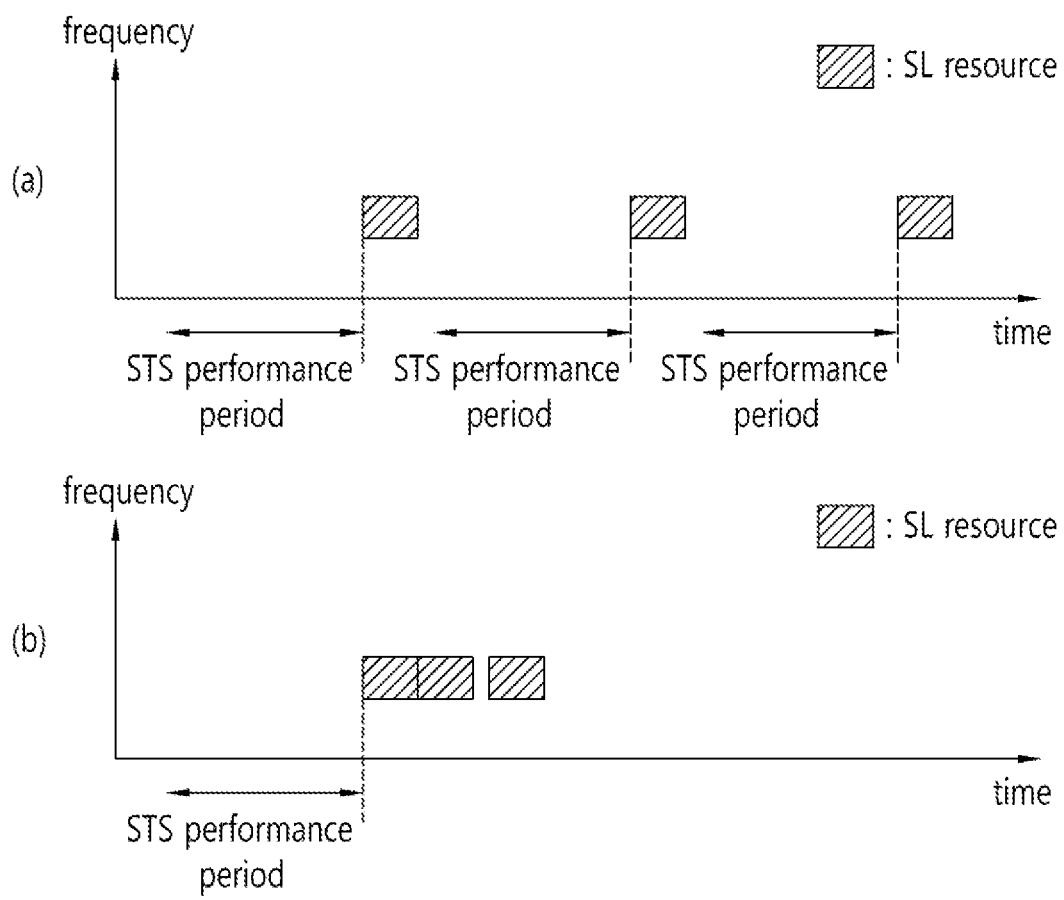
FIG. 10 is a figure for explaining why burst resource reservation is necessary.

FIG. 10 is a figure for explaining why burst resource reservation is necessary.

Referring to (a) of FIG. 10, when three resources are far apart in time, in order to avoid resource collision due to aperiodic transmission, a UE needs to perform STS for each of the three resources. In this case, power consumption of the UE may increase due to the three STSs.

For example, in order to minimize power consumption of the UE by such an STS, when the UE selects resources based on partial sensing or random selection, the UE selects resources adjacent to each other within a resource selection window. Referring to (b) of FIG. 10, the UE may select three adjacent resources within a resource selection window. In this case, the UE can avoid resource collision due to aperiodic transmission by performing one STS for three resources. Therefore, power consumption of the UE can be saved.

Due to the above reasons, aggregated resource-based SL transmission needs to be allowed in order to reduce power consumption of a UE, ensure reliability of SL communication, and increase resource use efficiency.

Figure 11:
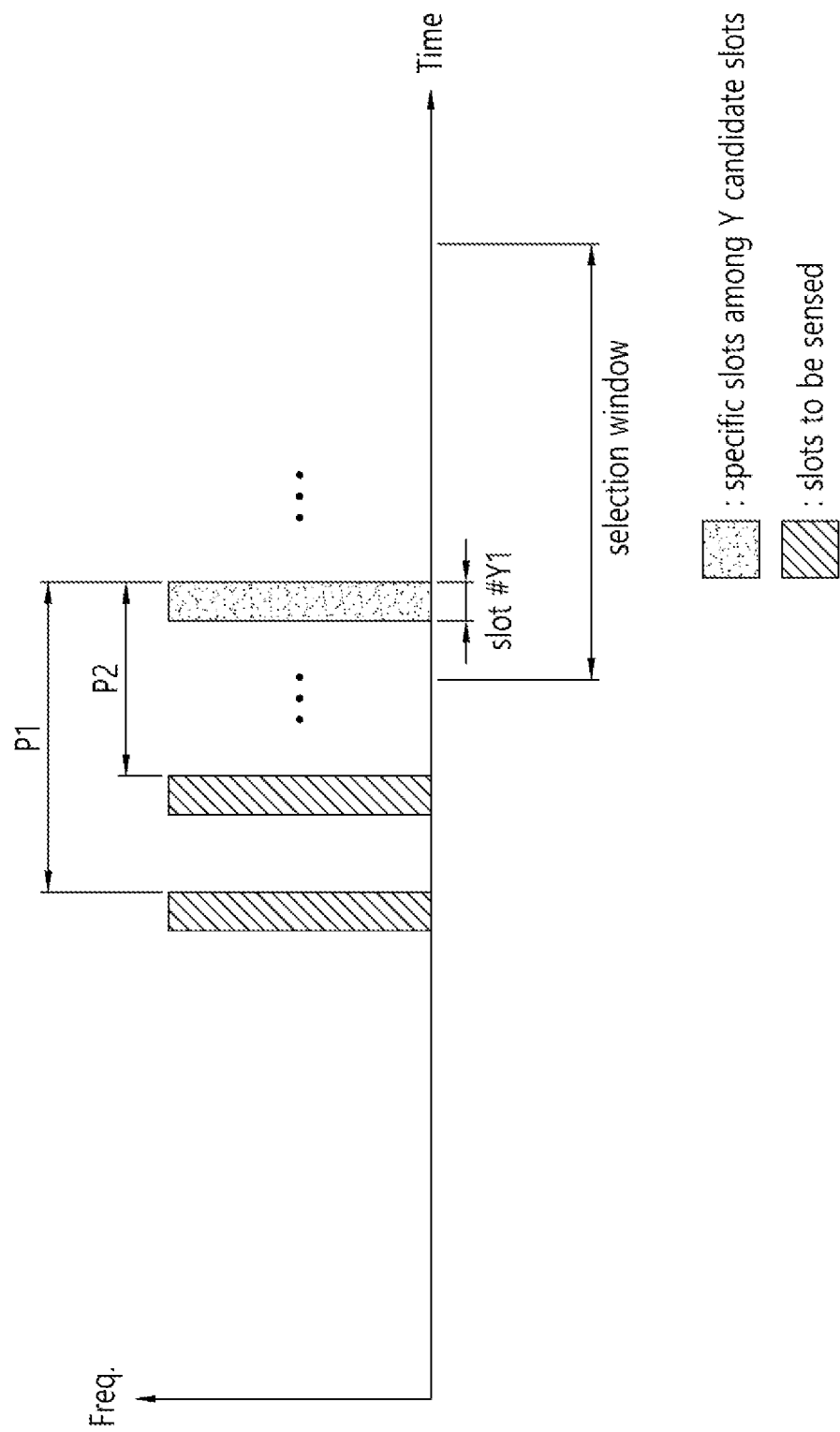
FIGS. 11 and 12 show a method for a ULE to perform PPS according to an embodiment of the present disclosure.
Figure 12:
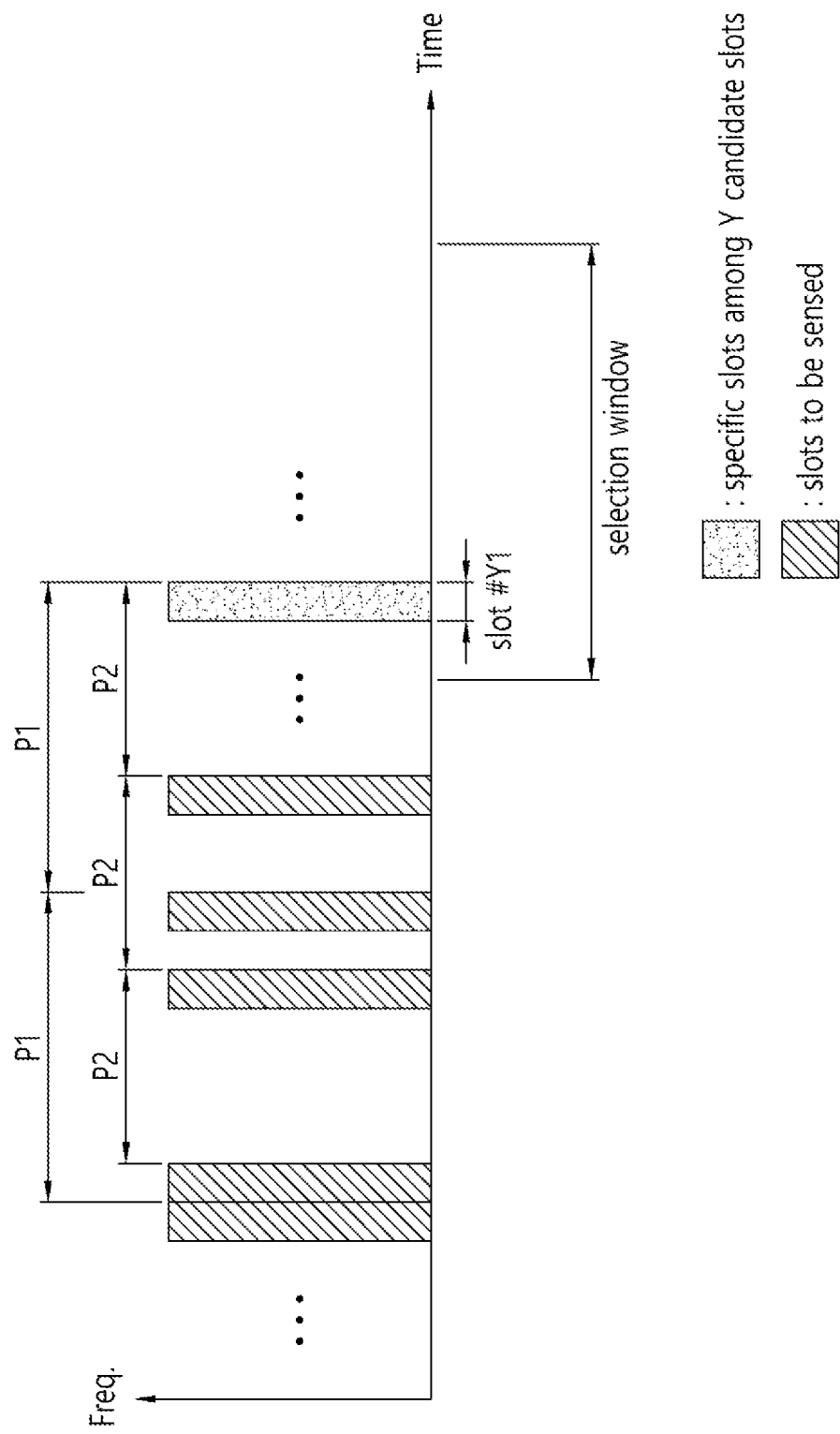

FIGS. 11 and 12 show a method for a UE to perform PPS according to an embodiment of the present disclosure. The embodiments of FIGS. 11 and 12 may be combined with various embodiments of the present disclosure.

Referring to FIGS. 11 and 12, it is assumed that a resource reservation period allowed for a resource pool or a resource reservation period configured for PPS is P1 and P2. Furthermore, it is assumed that a UE performs partial sensing (i.e., PPS) for selecting an SL resource in slot #Y1.

Referring to FIG. 11, a UE may perform sensing on a slot positioned before P1 from slot #Y1 and a slot positioned before P2 from slot #Y1.

Referring to FIG. 12, a UE may perform sensing on a slot located before P1 from slot #Y1 and a slot located before P2 from slot #Y1. Furthermore, optionally, a UE may perform sensing on a slot positioned before A*P1 from slot #Y1 and a slot positioned before B*P2 from slot #Y1. For example, A and B may be positive integers of 2 or greater. Specifically, for example, a UE selecting slot #Y1 as a candidate slot may perform sensing for slot #(Y1-resource reservation period*k), and k may be a bitmap. For example, if k is 10001, a UE selecting slot #Y1 as a candidate slot may perform sensing for slot #(Y1-P1*1), slot #(Y1-P1*5), slot #(Y1-P2*1), and slot #(Y1-P2*5).

For example, according to various embodiments of the present disclosure, continuous partial sensing (CPS) may refer to an operation of sensing all or a part of a time domain given as a specific configuration value. For example, CPS may include a short-term sensing operation in which sensing is performed for a relatively short period.

Figure 13:
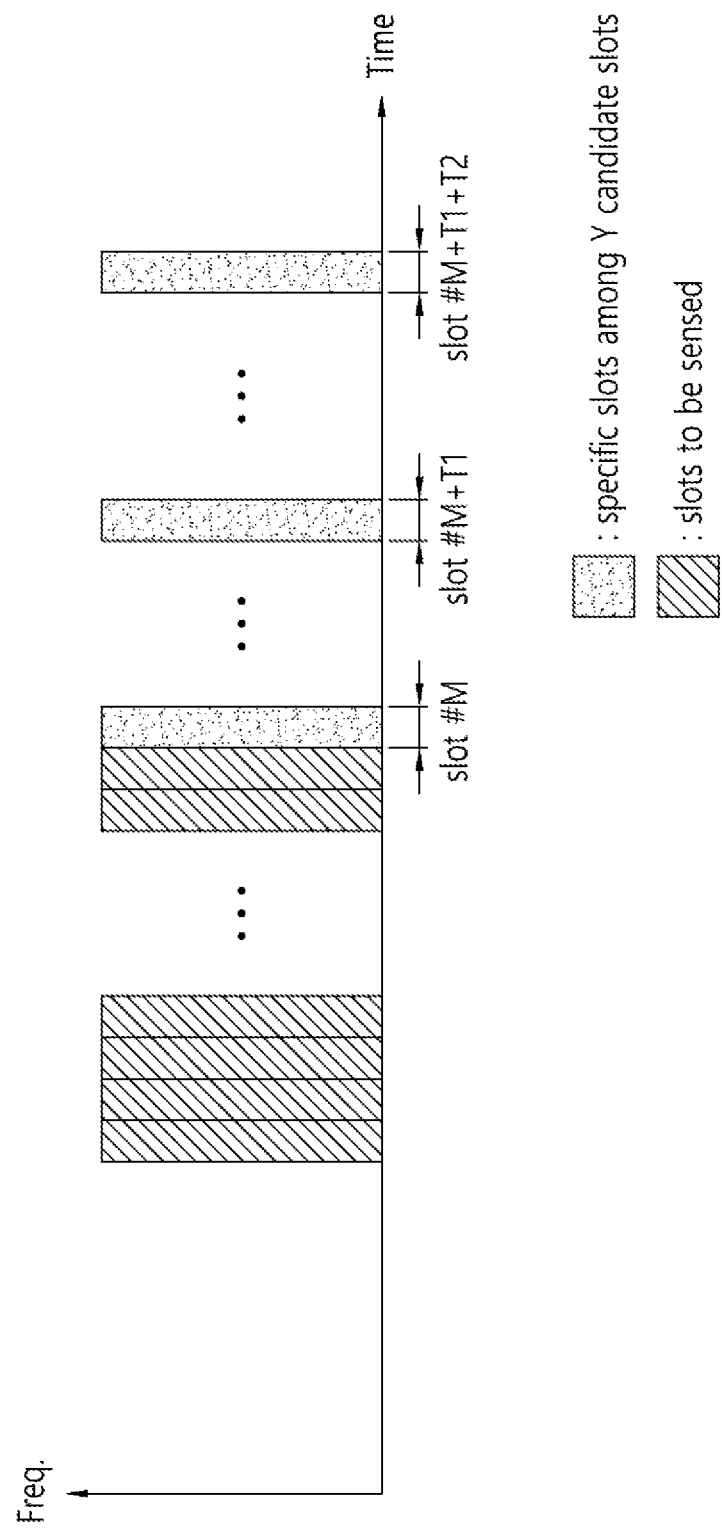
FIG. 13 shows a method for a UE to perform CPS, according to an embodiment of the present disclosure.

FIG. 13 shows a method for a UE to perform CPS, according to an embodiment of the present disclosure. The embodiment of FIG. 13 may be combined with various embodiments of the present disclosure.

In the embodiment of FIG. 13, it is assumed that Y candidate slots selected by a UE are slot #M, slot #(M+T1), and slot #(M+T1+T2). In this case, a slot in which a UE needs to perform sensing may be determined based on the first slot (i.e., slot #M) among Y candidate slots. For example, after determining the first slot among Y candidate slots as a reference slot, a UE may perform sensing for (previous) N slots from the reference slot.

Referring to FIG. 13, based on the first slot (i.e., slot #M) among Y candidate slots, a UE may perform sensing of N slots. For example, a UE may perform sensing for N slots before slot #M, the UE may select at least one SL resource from in Y candidate slots (i.e., slot #M, slot #(M+T1), and slot #(M+T1+T2)) based on a sensing result. For example, N may be configured or pre-configured for a UE. For example, a time gap for processing may exist between the last slot among the N slots and slot #M.

In this specification, the wording "configuration or definition" may be interpreted as being (pre)configured (via predefined signaling (e.g., SB, MAC signaling, RRC signaling)) from a base station or network. For example, "A may be configured" may include "a base station or network (pre)configuring/defining or notifying A of a UE". Alternatively, the wording "configuration or definition" may be interpreted as being previously configured or defined by system. For example, "A may be configured" may include "A is (pre-)configured/defined by system".

Referring to the standard document, some procedures and technical specifications related to the present disclosure are as follows.

TABLE 12

| 3GPP TS 36.213 V16.2.0 |
| --- |
| 14.1.1.6 UE procedure for determining the subset of resources to be reported to higher layers in PSSCH resource selection in sidelink transmission mode 4 and in sensing measurement in sidelink transmission mode 3 |
| In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B. |
| In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$ = 10*SL_RESOURCE_RESELECTION_COUNTER, where SL_RESOURCE_RESELECTION_COUNTER is provided by higher layers [11]. |

TABLE 13

| If partial sensing is configured by higher layers then the following steps are used: |
| --- |
| 1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframes which consists of at least Y subframes within the time interval [n + $T_1$, n + $T_2$] where selections of $T_1$ and $T_2$ are up to UE implementations under $T_1$ ≤ 4 and $T_{2min}(prio_{TX})$ ≤ $T_2$ ≤ 100, if $T_{2min}(prio_{TX})$ is provided by higher layers for $prio_{TX}$, otherwise 20 ≤ $T_2$ ≤ 100. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$. |

TABLE 13-continued

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i = (a − 1) * 8 + b.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
 the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
 PSSCH-RSRP measurement according to the received SCI format 1 is higher than $Th_{prio_{TX},prio_{RX}}$.
 the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$ for q = 1, 2, . . . , Q and j = 0, 1, . . . , $C_{resel}$ − 1.

Here, $Q = \dfrac{1}{P_{rsvp\_RX}}$ if $P_{rsvp\_RX} < 1$ and y' − m ≤ $P_{step} \times P_{rsvp\_RX} + P_{step}$, where $t_y^{SL}$ is the last subframe of the Y subframes, and Q = 1 otherwise.

TABLE 14

6) If the number of candidate single-subframe resources remaining in the set $s_A$ is smaller than 0.2 · $M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH}$ − 1 in the monitored subframes in Step 2 that can be expressed by $t_{y-P_{step} * j}^{SL}$ for a non-negative integer j.
8) The UE moves the candidate single-subframe resource $R_{x,y}$ with the smallest metric $E_{x,y}$ from the set $s_A$ to $s_B$. This step is repeated until the number of candidate single-subframe resources in the set $s_B$ becomes greater than or equal to 0.2 · $M_{total}$.
9) When the UE is configured by upper layers to transmit using resource pools on multiple carriers, it shall exclude a candidate single-subframe resource $R_{x,y}$ from $s_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

TABLE 15

The UE shall report set $s_B$ to higher layers.
If transmission based on random selection is configured by upper layers and when the UE is configured by upper layers to transmit using resource pools on multiple carriers, the following steps are used:
1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall assume that any set of $L_{subCH}$ contiguous sub-channels included in the corresponding PSSCH resource pool (described in 14.1.5) within the time interval [n + $T_1$, n + $T_2$] corresponds to one candidate single-subframe resource, where selections of $T_1$ and $T_2$ are up to UE implementations under $T_1 \le 4$ and $T_{2\ min}(prio_{TX}) \le T_2 \le 100$, if $T_{2\ min}(prio_{TX})$ is provided by higher layers for $prio_{TX}$, otherwise $20 \le T_2 \le 100$. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $s_A$ to $s_B$.
4) The UE shall exclude a candidate single-subframe resource $R_{x,y}$ from $s_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].
The UE shall report set $s_B$ to higher layers.

On the other hand, in the existing power saving UE operation, when selecting a candidate resource based on partial sensing, the sidelink (SL) discontinuous reception (DRX) operation was not considered, as a result, there is a problem in that transmission power required for transmission and reception of the power saving UE is not efficiently used.

According to an embodiment of the present disclosure, when a power saving UE performs an SL DRX operation, a resource selection window and candidate resource selection method for minimizing transmission/reception power consumption when selecting candidate resources based on partial sensing and a device supporting the same are proposed.

For example, for (or, for each of) at least one among elements/parameters of service type (and/or (LCH or service) priority and/or QOS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re)transmission from a transmitting UE, etc.), whether the rule is applied (and/or the proposed method/rule-related parameter value of the present disclosure) may be specifically (or differently or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE) PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, the term "specific threshold" below may refer to a threshold value defined in advance or (pre-)configured by a higher layer (including an application layer) of a network, a base station, or a UE. Hereinafter, the term "specific configuration value" may refer to a value defined in advance or (pre-)configured by a higher layer (including an application layer) of a network, a base station, or a UE. Hereinafter, "configured by a network/base station" may mean an operation in which a base station configures (in advance) a UE by higher layer RRC signaling, configures/signals a UE through MAC CE, or signals a UE through DCI.

According to an embodiment, when a power saving UE (P-UE) selects Y candidate slots including candidate resources within a resource selection window for resource selection based on partial sensing, the minimum value or range of the minimum value of Y may be configured or selected to be within a packet delay budget (PDB) of a packet to be transmitted. Alternatively, the minimum value or range of the minimum value of Y may be configured as a specific threshold with a value greater than or equal to the maximum number of retransmissions for a transmission packet, or a UE may select the minimum value of Y or range of the minimum value within the specific threshold.

According to an embodiment, a UE may report the maximum number of retransmissions and/or the remaining number of retransmissions for a transport block (TB) to be transmitted to a base station. In this case, a UE can select the maximum number of retransmissions by implementation from among specific configured values or values (pre-)configured by network, and the UE may report the selected maximum number of retransmissions to a base station. The base station may configure the minimum value of Y based on the maximum number of retransmissions reported from the UE and signal the configured minimum value of Y to the UE.

For example, the minimum value Y may be separately configured or selected depending on whether or not a UE performs burst SL transmission through temporally adjacent or nearby transmission resources. Alternatively, for example, the minimum value or range of the minimum value of Y may be configured or be selected by a UE based on QoS requirements such as priority, latency, distance, and reliability related to transmission packets, cast type, congestion/interference level of a resource pool, whether a UE operates SL DRX, whether there is inter-UE coordination, in-coverage (IC)/out-of-coverage (OOC) operation status, the total number of retransmissions/remaining number of retransmissions for transmission packets, etc.

According to an embodiment, when a transmitting UE performs partial sensing-based resource selection allowed/configured in a (transmitting) resource pool and a receiving UE performs an SL DRX operation allowed/configured in a resource pool, the resource selection window of the transmitting UE may be configured to fully or partially overlap with an SL DRX on-duration or active time used by the receiving UE or configured in a (receiving) resource pool. As described above, when the resource selection window and the on-duration or active time overlap each other, a front part of the resource selection window may overlap the on-duration or active time. That is, when the resource selection window of the transmitting UE is configured to the interval [n+T1, n+T2], for a T3 value that is less than or equal to T2, the interval [n+T1, n+T3] may be included in the on-duration or active time configured in the receiving UE or resource pool. For example, the T3 value may be configured to a specific threshold value, may be determined by UE implementation within a specific threshold value, or may be determined by UE implementation within a range that satisfies the condition of T3<T2.

According to an embodiment, an SL DRX cycle of a UE may be configured to coincide with a transmission resource period configured in the resource pool or to be a multiple of the transmission resource period. For example, when one or more transmission resource periods are configured in the resource pool, an SL DRX cycle may be configured to be a common multiple or least common multiple of all resource transmission periods or some resource transmission periods. For example, for resource transmission periods not included in the common multiple or least common multiple relationship, the transmission time according to the resource transmission period may be configured to be included in the on-duration or active time, or the resource transmission time may be configured to be included in the separate active time by generating a separate active time, when the on-duration or active time of an SL DRX cycle is extended by an inactivity timer, etc.

According to an embodiment, when a transmitting UE performing partial sensing-based resource selection selects Y candidate slots within a resource selection window, X number of candidate slots less than or equal to Y may be configured by a UE implementation or (pre-)configured by a higher layer or network to be included in an SL DRX on-duration or active time used by a receiving UE or configured in a resource pool. For example, the ratio of the number of candidate resources to be applied to an SL DRX off-duration or inactive time period to the number of candidate resources to be applied to an SL DRX on-duration or active time period may be configured to a specific configuration value or may be determined by a UE implementation within a specific threshold value. For example, the X candidate slots may be selected such that a ratio of the X candidate slots within the Y candidate slots is equal to or greater than a specific threshold value. For example, the specific threshold may be pre-configured for a transmitting UE or may be signaled from a base station/network.

For example, at this time, the X value or the ratio of the number of candidate resources to be applied to an SL DRX off-duration or inactive time period to the number of candidate resources to be applied to an SL DRX on-duration or active time period may be configured separately according to QoS requirements such as delay/reliability/distance related to transmission packets, a service/packet priority, a cast type, the congestion/interference level of a resource pool, transmit power level, whether it is a HARQ enabled/disabled MAC PDU transmission, the HARQ ACK/NACK ratio, the number of (continuous) HARQ NACK receptions, whether it is an SL DRX operation, whether it is a inter-UE-coordinating UE or inter-UE-coordinated UE, whether it is a relaying UE or a remote UE, a sync selection priority of a reference sync signal of a UE, the MCS size/number of layers, CSI, the remaining battery power amount of a UE, the PDB of remaining transmission packets, the maximum number of retransmissions for packets, the number of remaining retransmissions, whether a peer UE is a P-UE, the SL DRX cycle length, the SL DRX on-duration length, the ratio of SL DRX cycle length to an SL DRX on-duration, the number of initial transmissions and blind retransmissions to be transmitted during an SL DRX on-duration or an active time period.

Figure 14:
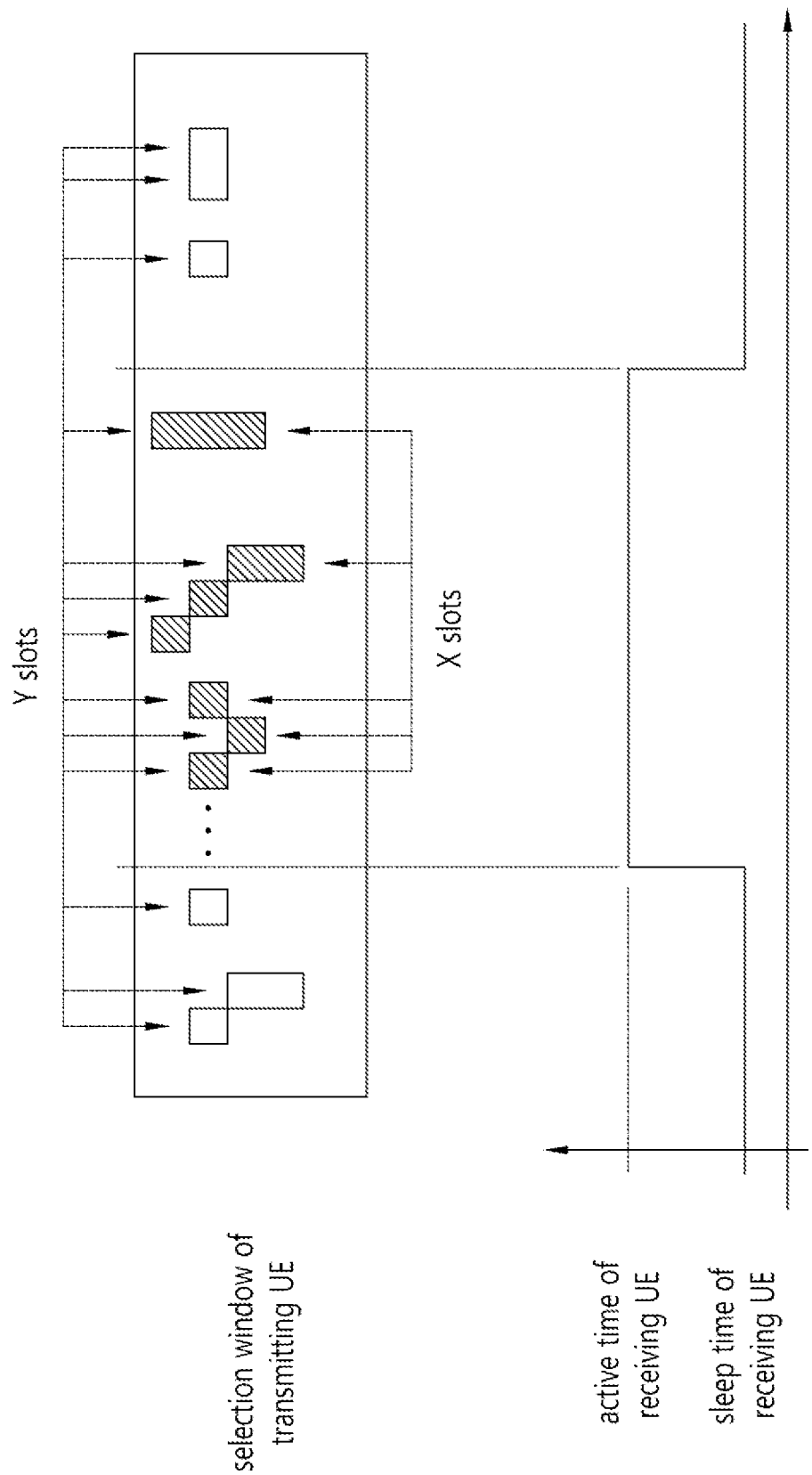
FIG. 14 shows a procedure for determining a set of candidate resources of transmission resources for performing an SL transmission by a transmitting UE according to an embodiment of the present disclosure.

FIG. 14 shows a procedure for determining a set of candidate resources of transmission resources for performing an SL transmission by a transmitting UE according to an embodiment of the present disclosure. The embodiment of FIG. 14 may be combined with various embodiments of the present disclosure.

Referring to FIG. 14, a selection window for selecting a transmission resource to be used by a transmitting UE to perform an SL transmission is shown. A transmitting UE may select candidate resources on a selection window based on sensing. For example, the candidate resources may be selected based on a result of the sensing, and the result of the sensing may include an RSRP value. For example, if the RSRP value as a result of sensing for a transmission resource is lower than an RSRP offset, the transmission resource may be included in the candidate resources.

Each of the rectangles shown in a selection window of FIG. 14 may mean a resource selected as a candidate resource based on a sensing result. In FIG. 14, it is assumed that resources corresponding to Y slots are selected as candidate resources. Here, according to an embodiment of the present disclosure, a transmitting UE may select a set of candidate resources such that a certain portion (i.e., X slots) of the candidate resources exists within an SL DRX active time of a receiving UE performing an SL DRX operation. For example, in FIG. 14, the transmitting UE may select a set of candidate resources such that candidate resources corresponding to Y slots include candidate resources corresponding to the X slots. Here, the X may be configured according to an embodiment of the present disclosure.

According to an embodiment, when the number of the idle resources included in the SL DRX on-duration or active time period is less than the X value among valid idle resources remaining after excluding resources based on partial sensing within a resource selection window during a resource selection process by a transmitting UE, a specific threshold value related to RSRP used to select valid idle resources may be increased by a specific configuration value related to RSRP offset (e.g., 3 dB). For example, as described above, in an operation of making the number of idle resources included in the SL DRX on-duration or active time period finally greater than or equal to the X value by continuing to increase the RSRP-related specific threshold, the above process may be repeatedly performed.

Figure 15:
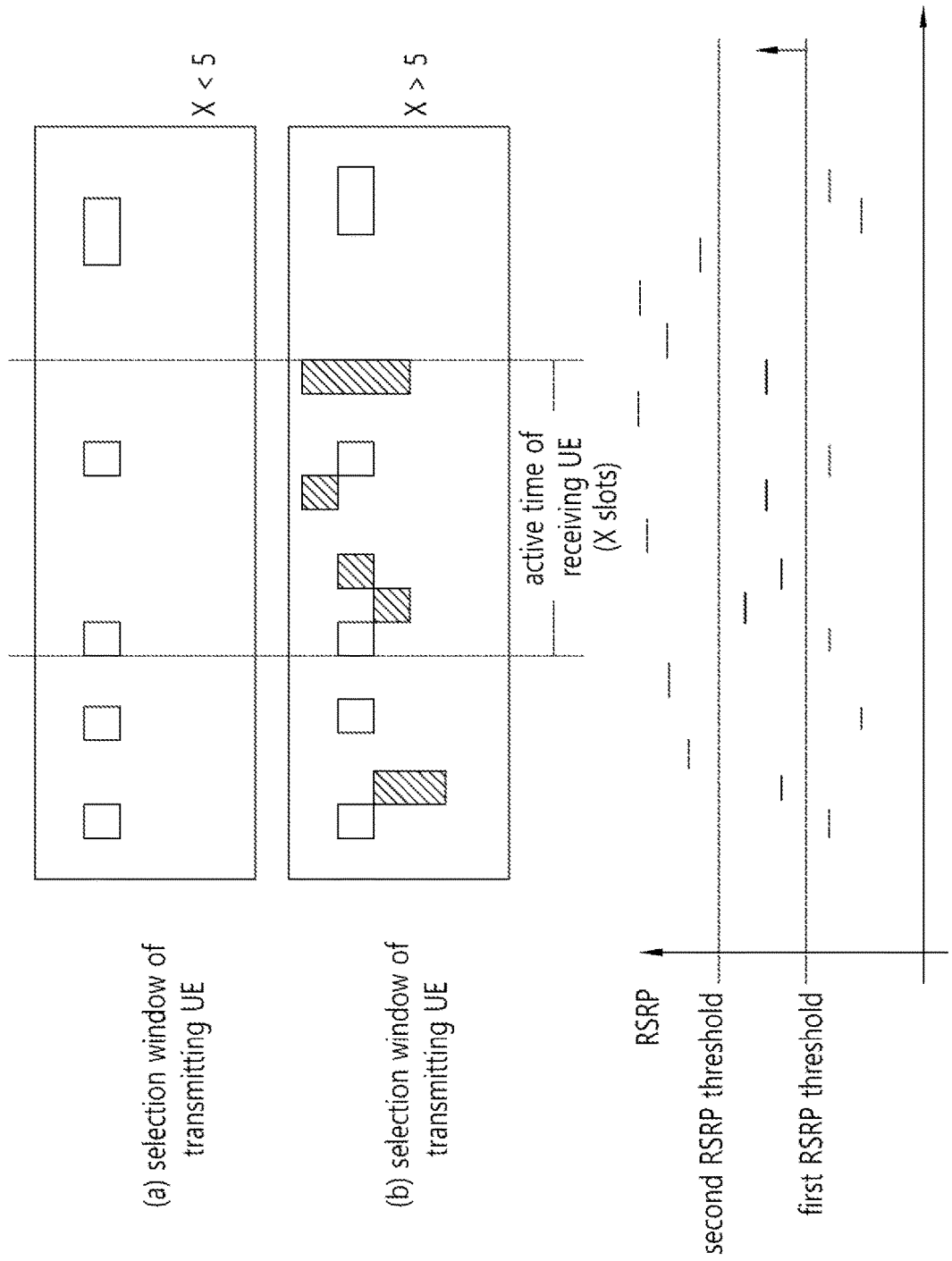
FIG. 15 shows a procedure for determining a set of candidate resources of transmission resources for performing an SL transmission by a transmitting UE according to an embodiment of the present disclosure.

FIG. 15 shows a procedure for determining a set of candidate resources of transmission resources for performing an SL transmission by a transmitting UE according to an embodiment of the present disclosure. The embodiment of FIG. 15 may be combined with various embodiments of the present disclosure.

Referring to FIG. 15, a selection window for selecting a transmission resource to be used by a transmitting UE for performing an SL transmission is shown. According to an embodiment, a transmitting UE may select a set of candidate resources for SL transmission such that, at least, resources of the threshold number of slots are included within an SL DRX active time of a receiving UE performing an SL DRX operation. For example, a transmitting UE may perform sensing to select a set of candidate resources, the result of the sensing may include an RSRP value. For example, if the RSRP value of the sensing result related to the resource is less than an RSRP threshold, a resource on a selection window may be selected as a candidate resource. In this example, it is assumed that the threshold number of slots of resources to be included within the SL DRX active time of the receiving UE is 5.

In (a) of FIG. 15, rectangles displayed in a selection window in (a) of FIG may represent resources selected as candidate resources because each RSRP value is less than the first RSRP threshold. Here, slots (X slots) of candidate resources included in an SL DRX active time of a receiving UE performing an SL DRX operation may be 2 slots. According to an embodiment of the present disclosure, since the number of slots of the candidate resource is less than a threshold number of slots of 5, a transmitting UE may increase the RSRP threshold to satisfy the threshold number of slots.

(b) of FIG. 15 shows an example in which a first RSRP threshold used in (a) of FIG. 15 is increased to a second RSRP threshold, in order for a transmitting UE to satisfy the threshold number of slots of candidate resources included in an active time. Hatched rectangles in (b) of FIG. 15 represent candidate resources newly selected as a candidate resource by increasing the RSRP threshold to the second RSRP threshold. Here, slots (X slots) of candidate resources included in the SL DRX active time of a receiving UE performing an SL DRX operation may be 6 slots. That is, since the number of slots of the candidate resources is greater than the threshold number of slots of 5, the transmitting UE may select the candidate resources of FIG. 15(*b*) as the final set of candidate resources.

According to an embodiment, in a transmission resource selection procedure, a specific threshold value related to RSRP and a specific configuration value related to RSRP offset to be applied to an SL DRX on-duration or active time period may be configured differently from a specific threshold value related to RSRP and a specific configuration value related to RSRP offset to be applied to an SL DRX off-duration or inactive time period. For example, a specific threshold value related to RSRP and specific configuration value related to RSRP offset to be applied to an SL DRX on-duration or active time period may be configured to be greater than a specific threshold value related to RSRP and a specific configuration value related to RSRP offset to be applied to an SL DRX off-duration or inactive time period.

According to an embodiment, the target ratio of valid idle resources to total resources to be applied to an SL DRX on-duration or active time period may be configured separately from the target ratio of valid idle resources to total resources to be applied to an SL DRX off-duration or inactive time period.

According to an embodiment, if the number of candidate slots (Y) to be selected for a UE performing partial sensing is configured, when a UE excludes a resource based on partial sensing and selects a valid idle resource, the UE may preferentially select a valid idle resource included in an interval overlapping with an SL DRX on-duration or active time within a resource selection window period. And, for example, if the number of resources included in the interval overlapping with the SL DRX on-duration or active time does not satisfy the target ratio of valid idle resources to the total resources, the UE may select the remaining valid idle resources in an SL DRX off-duration or inactive time period.

According to an embodiment, if the X value, or the ratio of the number of candidate resources to be applied to an SL DRX off-duration or an inactive time period to the number of candidate resources to be applied to an SL DRX on-duration or active time period is configured to a specific configuration value or determined by a UE implementation within a specific threshold value, if "the number of remaining valid idle resources within an on-duration or active time period" does not satisfy "the X value, or the ratio of the number of candidate resources to be applied to an SL DRX off-duration or an inactive time period to the number of candidate resources to be applied to an SL DRX on-duration or active time period" or "the ratio of total resources to target varid resources configured/determined in SL DRX on-duration or active time period" in a transmission resource selection procedure, a UE may increase the RSRP-related specific threshold configured for an SL DRX on-duration or active time period by a specific configuration value related to an RSRP offset (e.g., 3 dB). At this time, for example, the specific configuration value related to the RSRP offset may be configured or determined only for an SL DRX on-duration or active time period separately from the value applied to an SL DRX off-duration or inactive time period.

According to various embodiments of the present disclosure, the proposed resource selection window and candidate resource selection method has an effect of minimizing transmission and reception power consumption of a power saving UE performing an SL DRX operation in an NR-V2X system.

According to an embodiment of the present disclosure, the power saving effect of a transmitting UE may be improved by selecting candidate resources for resource selection based on PPS. In addition, since it is ensured that resources of a certain ratio or more of the candidate resources selected based on the PPS exist within an SL DRX active time of a receiving UE, the receiving UE can perform smoother SL reception based on the candidate resource.

Figure 16:
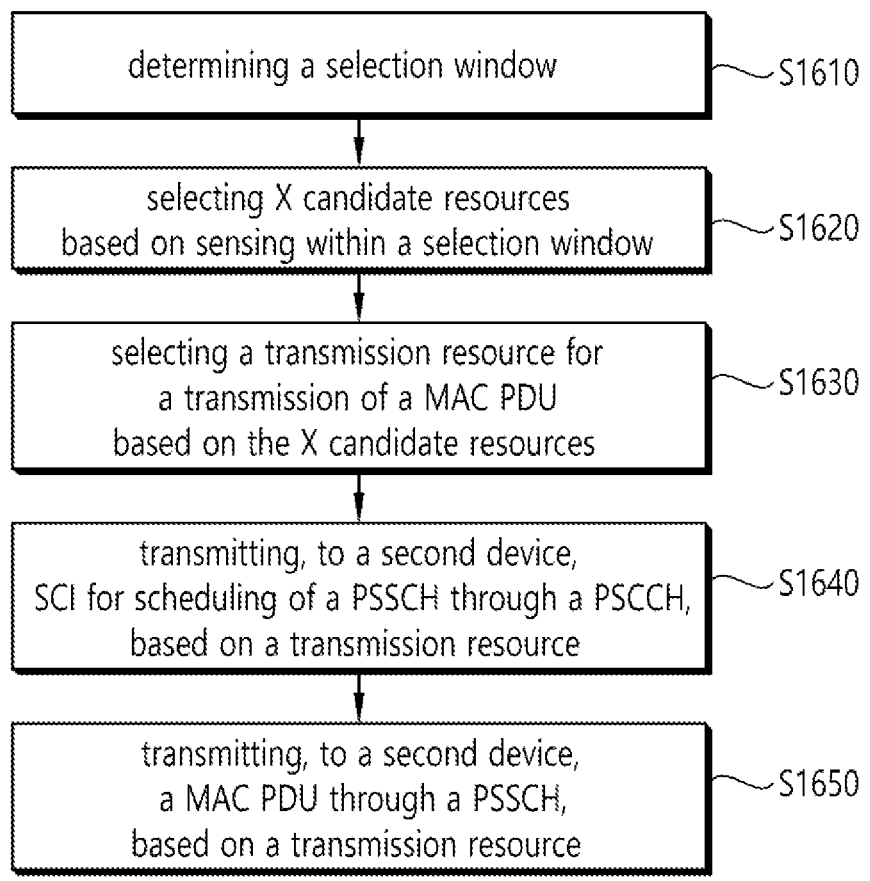
FIG. 16 shows a procedure for performing wireless communication by a first device according to an embodiment of the present disclosure.

FIG. 16 shows a procedure for performing wireless communication by a first device according to an embodiment of the present disclosure. The embodiment of FIG. 16 may be combined with various embodiments of the present disclosure.

Referring to FIG. 16, in step S1610, a first device may determine a selection window. In step S1620, the first device may select X candidate resources based on sensing within the selection window. For example, the X candidate resources may be included within an active time of a sidelink (SL) discontinuous reception (DRX) configuration related to a second device. In step S1630, the first device may select a transmission resource for a transmission of a medium access control (MAC) protocol data unit (PDU) based on the X candidate resources. In step S1640, the first device may transmit, to the second device, sidelink control information (SCI) for scheduling of a physical sidelink shared channel (PSSCH) through a physical sidelink control channel (PSCCH), based on the transmission resource. In step S1650, the first device may transmit, to the second device, the MAC PDU through the PSSCH, based on the transmission resource.

For example, selecting the X candidate resources may include: selecting Y candidate slots within the selection window; selecting Z or more candidate slots included within the active time among the Y candidate slots; and selecting the X candidate resources based on the sensing, among at least one resource included in the Z or more candidate slots.

For example, the Z may be greater than or equal to the X.

For example, additionally, the first device may obtain a first threshold related to ratio of the X compared to a total number of resources included in the Y candidate slots. For example, the Z or more candidate slots may be selected such that the ratio of the X compared to the total number of resources included in the Y candidate slots is greater than or equal to the first threshold.

For example, the first threshold may be determined based on at least one of a quality of service (QoS) requirement, a priority related to the MAC PDU, congestion level of a resource pool, or remaining packet delay budget (PDB) related to the MAC PDU.

For example, additionally, the first device may obtain a minimum number of resources included within the active time of the SL DRX configuration. For example, the X candidate resources may be greater than or equal to the minimum number.

For example, selecting the X candidate resources may include: increasing a second threshold related to reference signal received power (RSRP) related to the active time of the SL DRX configuration, based on a number of candidate resources included within the active time of the SL DRX configuration, selected based on the sensing, being less than the minimum number. For example, the X candidate resources may be selected based on the sensing and the second threshold, and the second threshold may be increased such that a number of resources included within the active time of the SL DRX configuration is the X.

For example, the second threshold may be increased by 3 dB at a time.

For example, a slot not including the Z candidate slots among the Y candidate slots may be not included within the active time of the SL DRX configuration.

For example, the Y may be determined based on whether the first device performs a burst transmission.

For example, selecting the X candidate resources may include: obtaining a target value related to a number of candidate resources within the selection window; selecting Y candidate slots within the selection window; and selecting N candidate resources among at least one resource included in the Y candidate slots, based on the sensing and a threshold related to RSRP. For example, the N may be greater than or equal to the target value, and the N candidate resources may include the X candidate resources.

For example, selecting the X candidate resources may include: obtaining a first target value related to a number of candidate resources within the selection window and a second target value related to a number of candidate resources within the active time; selecting Y candidate slots within the selection window; selecting N candidate resources among at least one resource included in the Y candidate slots, based on the sensing and a first threshold related to RSRP, wherein the N may be greater than or equal to the first target value; and selecting X candidate resources among at least one resource included in Z candidate slots based on the sensing and a second threshold related to RSRP, based on a number of resources included within the active time among the N candidate resources being less than the second target value. For example, the Z candidate slots may be slots included within the active time among the Y candidate slots.

For example, an SL DRX cycle of the SL DRX configuration may be an integer multiple of a resource reservation period allowed for a resource pool.

The above-described embodiment may be applied to various devices described below. For example, a processor 102 of a first device 100 may determine a selection window. And, the processor 102 of the first device 100 may select X candidate resources based on sensing within the selection window. For example, the X candidate resources may be included within an active time of a sidelink (SL) discontinuous reception (DRX) configuration related to a second device 200. And, the processor 102 of the first device 100 may select a transmission resource for a transmission of a medium access control (MAC) protocol data unit (PDU) based on the X candidate resources. And, the processor 102 of the first device 100 may control a transceiver 106 to transmit, to the second device 200, sidelink control information (SCI) for scheduling of a physical sidelink shared channel (PSSCH) through a physical sidelink control channel (PSCCH), based on the transmission resource. And, the processor 102 of the first device 100 may control the transceiver 106 to transmit, to the second device 200, the MAC PDU through the PSSCH, based on the transmission resource.

According to an embodiment of the disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine a selection window; select X candidate resources based on sensing within the selection window, wherein the X candidate resources may be included within an active time of a sidelink (SL) discontinuous reception (DRX) configuration related to a second device; select a transmission resource for a transmission of a medium access control (MAC) protocol data unit (PDU) based on the X candidate resources; transmit, to the second device, sidelink control information (SCI) for scheduling of a physical sidelink shared channel (PSSCH) through a physical sidelink control channel (PSCCH), based on the transmission resource; and transmit, to the second device, the MAC PDU through the PSSCH, based on the transmission resource.

For example, the operation of selecting the X candidate resources may include: selecting Y candidate slots within the selection window; selecting Z or more candidate slots included within the active time among the Y candidate slots; and selecting the X candidate resources based on the sensing, among at least one resource included in the Z or more candidate slots.

For example, the Z may be greater than or equal to the X.

For example, additionally, the first device may obtain a first threshold related to ratio of the X compared to a total number of resources included in the Y candidate slots. For example, the Z or more candidate slots may be selected such that the ratio of the X compared to the total number of resources included in the Y candidate slots is greater than or equal to the first threshold.

For example, the first threshold may be determined based on at least one of a quality of service (QoS) requirement, a priority related to the MAC PDU, congestion level of a resource pool, or remaining packet delay budget (PDB) related to the MAC PDU.

For example, additionally, the first device may obtain a minimum number of resources included within the active time of the SL DRX configuration. For example, the X candidate resources may be greater than or equal to the minimum number.

For example, the operation of selecting the X candidate resources may include: increasing a second threshold related to reference signal received power (RSRP) related to the active time of the SL DRX configuration, based on a number of candidate resources included within the active time of the SL DRX configuration, selected based on the sensing, being less than the minimum number. For example, the X candidate resources may be selected based on the sensing and the second threshold, and the second threshold may be increased such that a number of resources included within the active time of the SL DRX configuration is the X.

For example, the second threshold may be increased by 3 dB at a time.

For example, a slot not including the Z candidate slots among the Y candidate slots may be not included within the active time of the SL DRX configuration.

For example, the Y may be determined based on whether the first device performs a burst transmission.

For example, the operation of selecting the X candidate resources may include: obtaining a target value related to a number of candidate resources within the selection window; selecting Y candidate slots within the selection window; and selecting N candidate resources among at least one resource included in the Y candidate slots, based on the sensing and a threshold related to RSRP. For example, the N may be greater than or equal to the target value, and the N candidate resources may include the X candidate resources.

For example, the operation of selecting the X candidate resources may include: obtaining a first target value related to a number of candidate resources within the selection window and a second target value related to a number of candidate resources within the active time; selecting Y candidate slots within the selection window; selecting N candidate resources among at least one resource included in the Y candidate slots, based on the sensing and a first threshold related to RSRP, wherein the N may be greater than or equal to the first target value; and selecting X candidate resources among at least one resource included in Z candidate slots based on the sensing and a second threshold related to RSRP, based on a number of resources included within the active time among the N candidate resources being less than the second target value. For example, the Z candidate slots may be slots included within the active time among the Y candidate slots.

For example, an SL DRX cycle of the SL DRX configuration may be an integer multiple of a resource reservation period allowed for a resource pool.

According to an embodiment of the disclosure, a device adapted to control a first user equipment (UE) may be proposed. For example, the device may comprise: one or more processors; and one or more memories operably connectable to the one or more processors and storing instructions. For example, the one or more processors may execute the instructions to: determine a selection window; select X candidate resources based on sensing within the selection window, wherein the X candidate resources may be included within an active time of a sidelink (SL) discontinuous reception (DRX) configuration related to a second UE; select a transmission resource for a transmission of a medium access control (MAC) protocol data unit (PDU) based on the X candidate resources; transmit, to the second UE, sidelink control information (SCI) for scheduling of a physical sidelink shared channel (PSSCH) through a physical sidelink control channel (PSCCH), based on the transmission resource; and transmit, to the second UE, the MAC PDU through the PSSCH, based on the transmission resource.

According to an embodiment of the disclosure, a non-transitory computer-readable storage medium storing instructions may be proposed. For example, the instructions, when executed, may cause a first device to: determine a selection window; select X candidate resources based on sensing within the selection window, wherein the X candidate resources may be included within an active time of a sidelink (SL) discontinuous reception (DRX) configuration related to a second device; select a transmission resource for a transmission of a medium access control (MAC) protocol data unit (PDU) based on the X candidate resources; transmit, to the second device, sidelink control information (SCI) for scheduling of a physical sidelink shared channel (PSSCH) through a physical sidelink control channel (PSCCH), based on the transmission resource; and transmit, to the second device, the MAC PDU through the PSSCH, based on the transmission resource.

Figure 17:
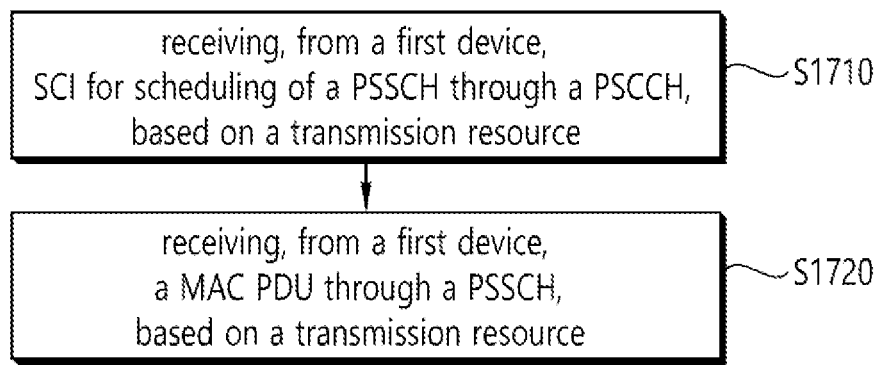
FIG. 17 shows a procedure for a second device to perform wireless communication according to an embodiment of the present disclosure.

FIG. 17 shows a procedure for a second device to perform wireless communication according to an embodiment of the present disclosure. The embodiment of FIG. 17 may be combined with various embodiments of the present disclosure.

Referring to FIG. 17, in step S1710, a second device may receive, from a first device, sidelink control information (SCI) for scheduling of a physical sidelink shared channel (PSSCH) through a physical sidelink control channel (PSCCH), based on a transmission resource. In step S1720, the second device may receive, from the first device, a medium access control (MAC) protocol data unit (PDU) through the PSSCH, based on the transmission resource, wherein the transmission may be selected in Y candidate resources. For example, X candidate resources among the Y candidate resources may be included within an active time of a sidelink (SL) discontinuous reception (DRX) configuration related to the second device, and the Y candidate resources may be selected based on sensing within a selection window.

For example, the sensing may be performed on resources prior to an integer multiple of a resource reservation period allowed in a resource pool from the Y candidate resources.

The above-described embodiment may be applied to various devices described below. For example, a processor 202 of a second device 200 may control a transceiver 206 to receive, from a first device 100, sidelink control information (SCI) for scheduling of a physical sidelink shared channel (PSSCH) through a physical sidelink control channel (PSCCH), based on a transmission resource. And, the processor 202 of the second device 200 may control the transceiver 206 to receive, from the first device 100, a medium access control (MAC) protocol data unit (PDU) through the PSSCH, based on the transmission resource, wherein the transmission may be selected in Y candidate resources. For example, X candidate resources among the Y candidate resources may be included within an active time of a sidelink (SL) discontinuous reception (DRX) configuration related to the second device, and the Y candidate resources may be selected based on sensing within a selection window.

According to an embodiment of the disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling of a physical sidelink shared channel (PSSCH) through a physical sidelink control channel (PSCCH), based on a transmission resource; and receive, from the first device, a medium access control (MAC) protocol data unit (PDU) through the PSSCH, based on the transmission resource, wherein the transmission may be selected in Y candidate resources, wherein X candidate resources among the Y candidate resources may be included within an active time of a sidelink (SL) discontinuous reception (DRX) configuration related to the second device, and wherein the Y candidate resources may be selected based on sensing within a selection window.

For example, the sensing may be performed on resources prior to an integer multiple of a resource reservation period allowed in a resource pool from the Y candidate resources.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
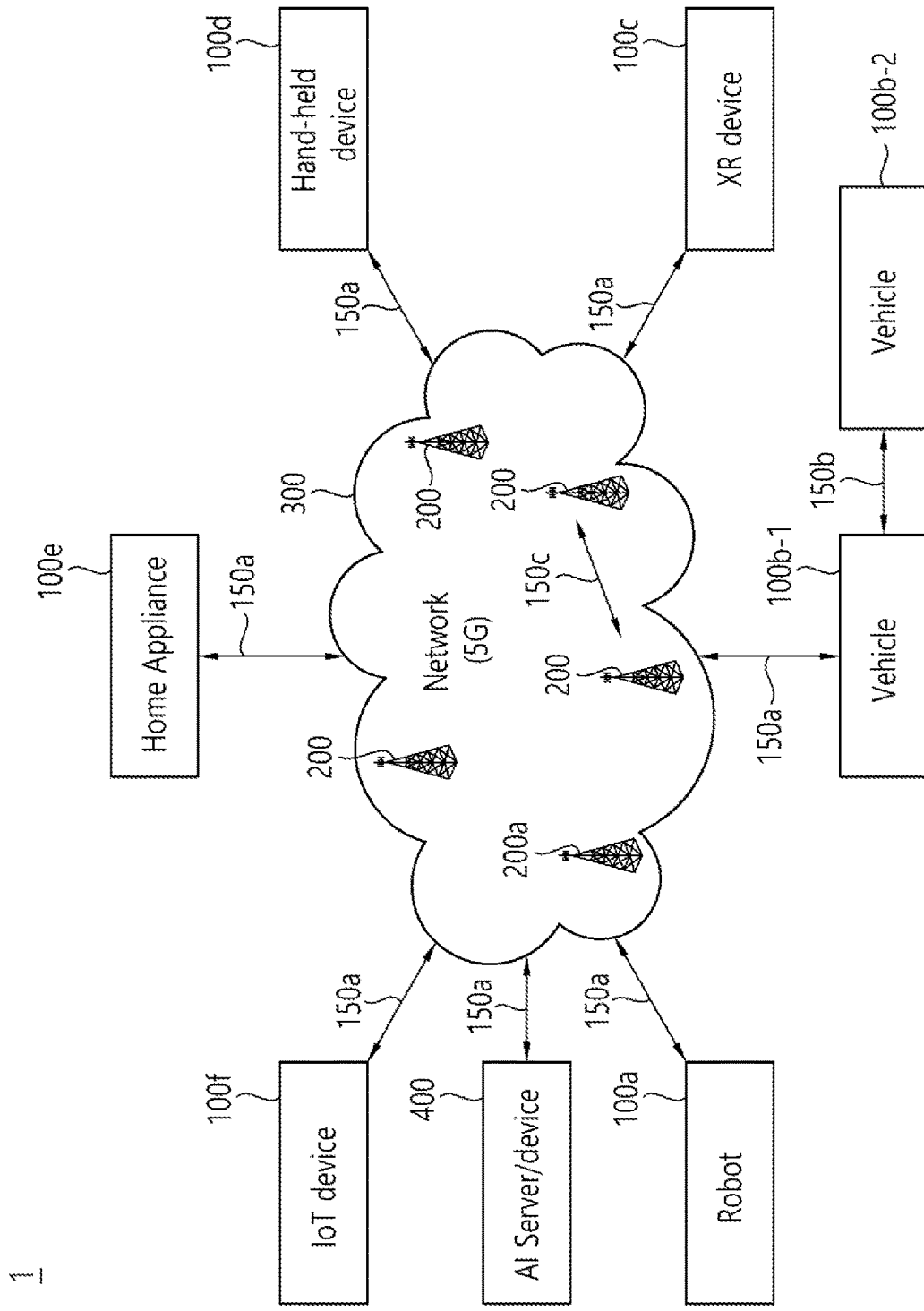
FIG. 18 shows a communication system 1, based on an embodiment of the present disclosure.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
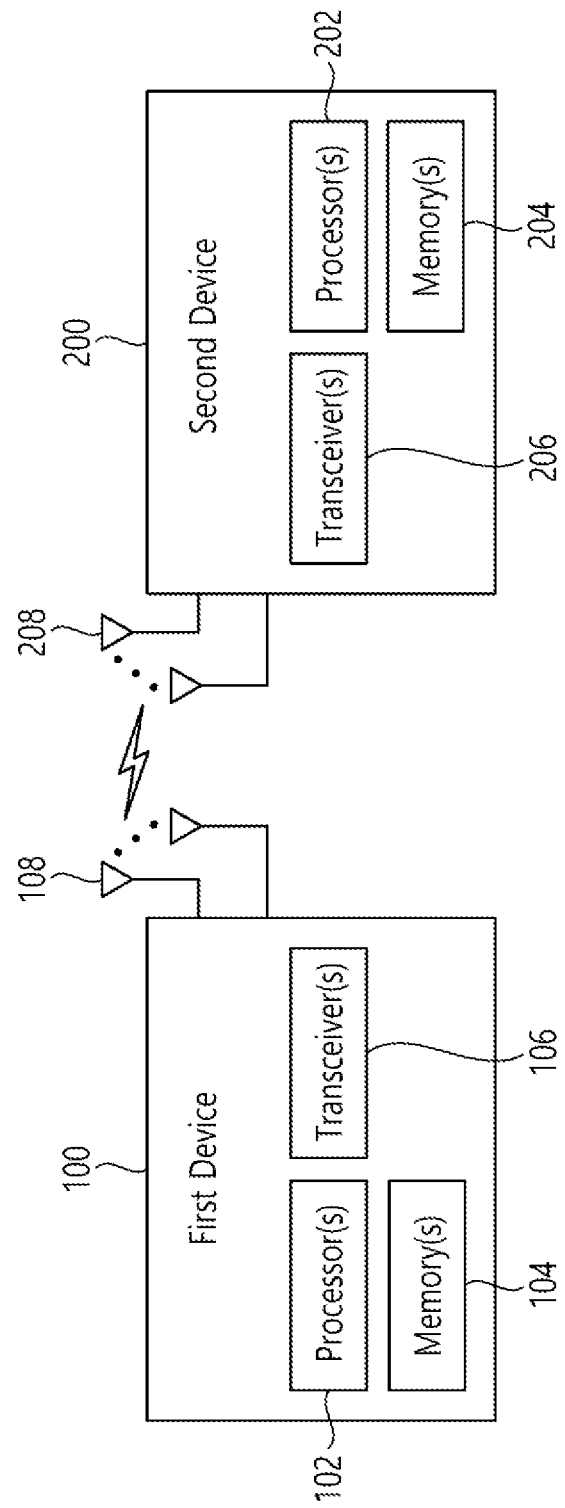
FIG. 19 shows wireless devices, based on an embodiment of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
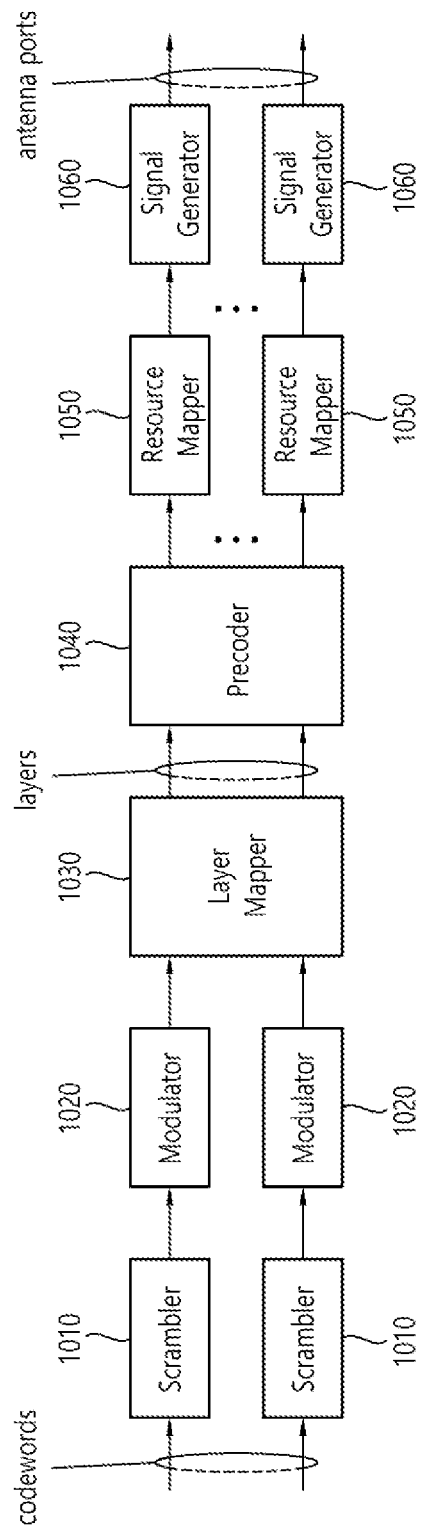
FIG. 20 shows a signal process circuit for a transmission signal, based on an embodiment of the present disclosure.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
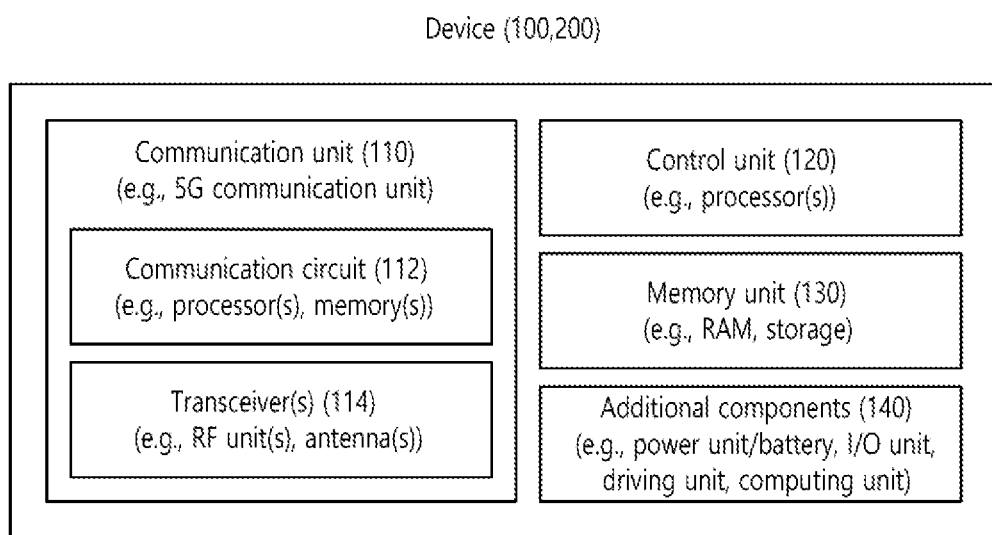
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
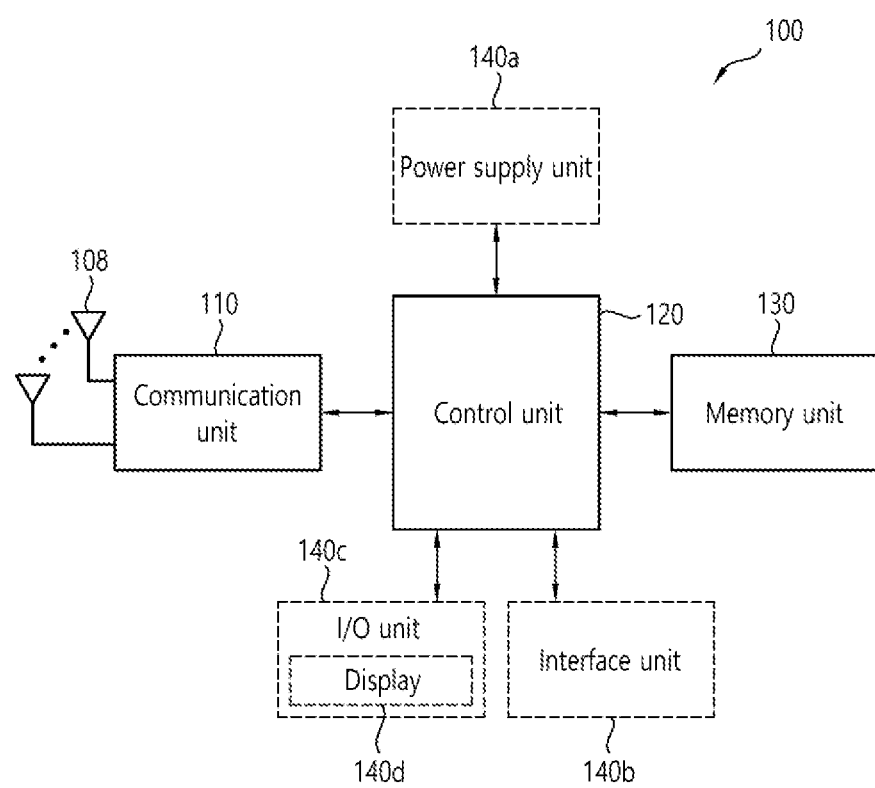
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    determining a selection window;
    determining a candidate resource set within the selection window based on sensing;
    based on the candidate resource set not including a resource within an active time of a sidelink (SL) discontinuous reception (DRX) configuration related to a second device, including at least one resource included within the active time in the candidate resource set;
    selecting a transmission resource for a transmission of a medium access control (MAC) protocol data unit (PDU) based on the candidate resource set;
    transmitting, to the second device, sidelink control information (SCI) for scheduling of a physical sidelink shared channel (PSSCH) through a physical sidelink control channel (PSCCH), based on the transmission resource; and
    transmitting, to the second device, the MAC PDU through the PSSCH, based on the transmission resource.

2. The method of claim 1, wherein determining the candidate resource set includes:
    selecting Y candidate slots within the selection window;
    selecting Z or more candidate slots included within the active time among the Y candidate slots;
    selecting X candidate resources based on the sensing, among at least one resource included in the Z or more candidate slots; and
    determining the X candidate resources as the candidate resource set.

3. The method of claim 2, wherein the Z is greater than or equal to the X.

4. The method of claim 2, further comprising:
    obtaining a first threshold related to ratio of the X compared to a total number of resources included in the Y candidate slots,
    wherein the Z or more candidate slots are selected such that the ratio of the X compared to the total number of resources included in the Y candidate slots is greater than or equal to the first threshold.

5. The method of claim 4, wherein the first threshold is determined based on at least one of a quality of service (QoS) requirement, a priority related to the MAC PDU, congestion level of a resource pool, or remaining packet delay budget (PDB) related to the MAC PDU.

6. The method of claim 2, further comprising:
    obtaining a minimum number of resources included within the active time of the SL DRX configuration,
    wherein the X candidate resources are greater than or equal to the minimum number.

7. The method of claim 6, wherein selecting the X candidate resources includes:
    increasing a second threshold related to reference signal received power (RSRP) related to the active time of the SL DRX configuration, based on a number of candidate resources included within the active time of the SL DRX configuration, selected based on the sensing, being less than the minimum number,
    wherein the X candidate resources are selected based on the sensing and the second threshold, and
    wherein the second threshold is increased such that a number of resources included within the active time of the SL DRX configuration is the X.

8. The method of claim 7, wherein the second threshold is increased by 3 dB at a time.

9. The method of claim 2, wherein a slot not including the Z candidate slots among the Y candidate slots is not included within the active time of the SL DRX configuration.

10. The method of claim 2, wherein the Y is determined based on whether the first device performs a burst transmission.

11. The method of claim 1, wherein determining the candidate resource set includes:
    obtaining a target value related to a number of candidate resources within the selection window;
    selecting Y candidate slots within the selection window;
    selecting N candidate resources among at least one resource included in the Y candidate slots, based on the sensing and a threshold related to RSRP; and
    determining the N candidate resources as the candidate resource set,
    wherein the N is greater than or equal to the target value.

12. The method of claim 1, wherein determining the candidate resource set includes:
    obtaining a first target value related to a number of candidate resources within the selection window and a second target value related to a number of candidate resources within the active time;
    selecting Y candidate slots within the selection window;
    selecting N candidate resources among at least one resource included in the Y candidate slots, based on the sensing and a first threshold related to RSRP,
    wherein the N is greater than or equal to the first target value;
    selecting X candidate resources among at least one resource included in Z candidate slots based on the sensing and a second threshold related to RSRP, based on a number of resources included within the active time among the N candidate resources being less than the second target value,
wherein the Z candidate slots are slots included within the active time among the Y candidate slots; and
determining the X candidate resources as the candidate resource set.

13. The method of claim 1, wherein an SL DRX cycle of the SL DRX configuration is an integer multiple of a resource reservation period allowed for a resource pool.

14. A first device for performing wireless communication, the first device comprising:
one or more memories storing instructions;
one or more transceivers; and
one or more processors connected to the one or more memories and the one or more transceivers, wherein the one or more processors execute the instructions to:
determine a selection window;
determine a candidate resource set within the selection window based on sensing;
based on the candidate resource set not including a resource within an active time of a sidelink (SL) discontinuous reception (DRX) configuration related to a second device, include at least one resource included within the active time in the candidate resource set;
select a transmission resource for a transmission of a medium access control (MAC) protocol data unit (PDU) based on the candidate resource set;
transmit, to the second device, sidelink control information (SCI) for scheduling of a physical sidelink shared channel (PSSCH) through a physical sidelink control channel (PSCCH), based on the transmission resource; and
transmit, to the second device, the MAC PDU through the PSSCH, based on the transmission resource.

15. A device adapted to control a first user equipment (UE), the device comprising:
one or more processors; and
one or more memories operably connectable to the one or more processors and storing instructions, wherein the one or more processors execute the instructions to:
determine a selection window;
determine a candidate resource set within the selection window based on sensing;
based on the candidate resource set not including a resource within an active time of a sidelink (SL) discontinuous reception (DRX) configuration related to a second UE, include at least one resource included within the active time in the candidate resource set;
select a transmission resource for a transmission of a medium access control (MAC) protocol data unit (PDU) based on the candidate resource set;
transmit, to the second UE, sidelink control information (SCI) for scheduling of a physical sidelink shared channel (PSSCH) through a physical sidelink control channel (PSCCH), based on the transmission resource; and
transmit, to the second UE, the MAC PDU through the PSSCH, based on the transmission resource.

* * * * *